United States Patent
McKiernan et al.

(10) Patent No.: US 10,065,081 B1
(45) Date of Patent: Sep. 4, 2018

(54) OBJECT POSITIONING SYSTEM

(71) Applicant: GTB Innovations, LLC, West Palm Beach, FL (US)

(72) Inventors: Glenn McKiernan, Delray Beach, FL (US); Robert J Blair, West Palm Beach, FL (US); Patricia Murphy, West Palm Beach, FL (US)

(73) Assignee: GTB Innovations, LLC, West Palm Beach, FL (US)

( * ) Notice: Subject to any disclaimer, the term of this patent is extended or adjusted under 35 U.S.C. 154(b) by 0 days.

(21) Appl. No.: 15/447,939

(22) Filed: Mar. 2, 2017

(51) Int. Cl.
 *H02K 7/09* (2006.01)
 *A63B 47/00* (2006.01)
 *H02N 15/00* (2006.01)

(52) U.S. Cl.
 CPC ............. *A63B 47/00* (2013.01); *H02N 15/00* (2013.01)

(58) Field of Classification Search
 CPC .................................. H02K 7/09; H02K 7/025
 See application file for complete search history.

(56) References Cited

U.S. PATENT DOCUMENTS

| | | | |
|---|---|---|---|
| 5,145,176 A | 9/1992 | Lipson | |
| 5,925,952 A * | 7/1999 | Bichler | B64G 1/28 310/74 |
| 6,570,286 B1 * | 5/2003 | Gabrys | F16C 32/0414 310/90.5 |
| 6,672,979 B2 | 1/2004 | Brenneisen | |
| D498,431 S | 11/2004 | Ditmars, Jr. | |
| 7,682,265 B2 | 3/2010 | VanDelden | |
| 8,258,663 B2 * | 9/2012 | Smoot | H02N 15/00 310/90.5 |
| 8,397,664 B2 | 3/2013 | Lin et al. | |
| 8,490,974 B2 | 7/2013 | Stolten | |
| 8,617,006 B2 | 12/2013 | VanDelden | |
| 8,717,129 B1 | 5/2014 | Cash | |
| 2005/0043127 A1 | 2/2005 | Stephens | |
| 2006/0154217 A1 | 7/2006 | Pachler | |
| 2008/0045358 A1 | 2/2008 | VanDelden | |
| 2014/0210578 A1 | 7/2014 | Hundelt | |

* cited by examiner

*Primary Examiner* — Dang Le
(74) *Attorney, Agent, or Firm* — Christopher & Weisberg, P.A.

(57) ABSTRACT

A system and device system for controlling a height of a levitated object based on a height selection made by a user. The system includes a user input device configured to receive the height selection made by the user, a base in communication with the user input device, and a power source. The base includes a magnet array having a central electromagnet configured to exert an adjustable magnetic force in a first direction, a plurality of peripheral electromagnets each being configured to exert an adjustable magnetic force in the first direction, and a permanent magnet being configured to exert a non-adjustable magnet force in a second direction at least substantially opposite the first direction. The power source is configured to deliver an adjustable current to the magnet array, such that adjustment of the current controls the levitation height of the object.

17 Claims, 22 Drawing Sheets

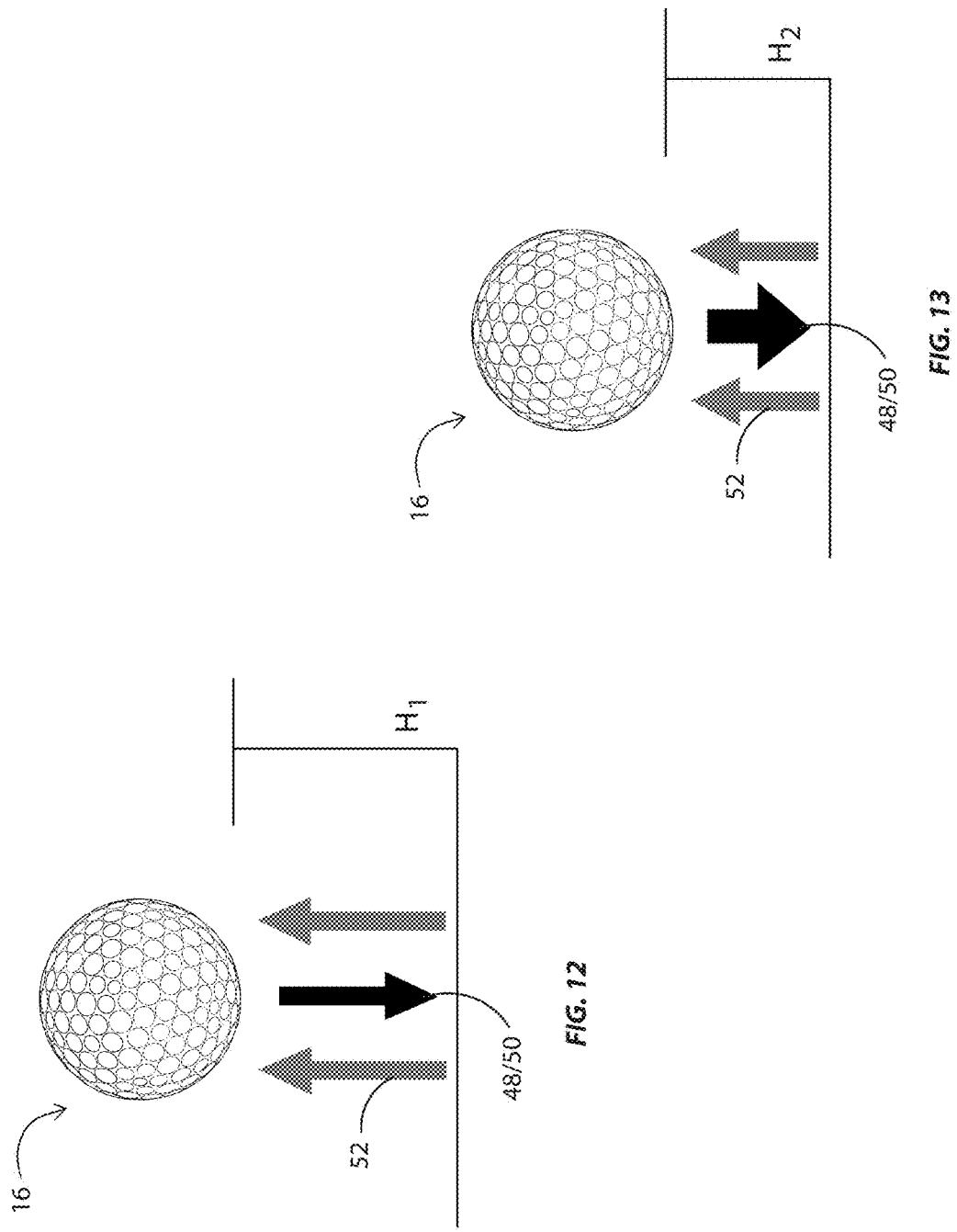

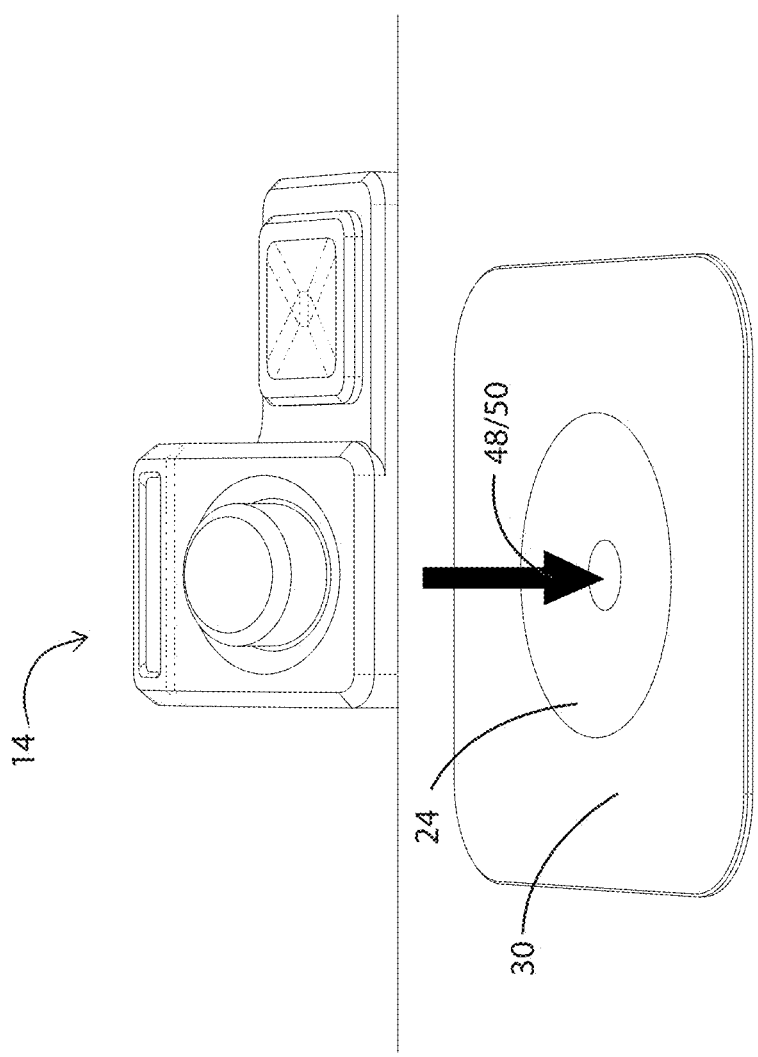

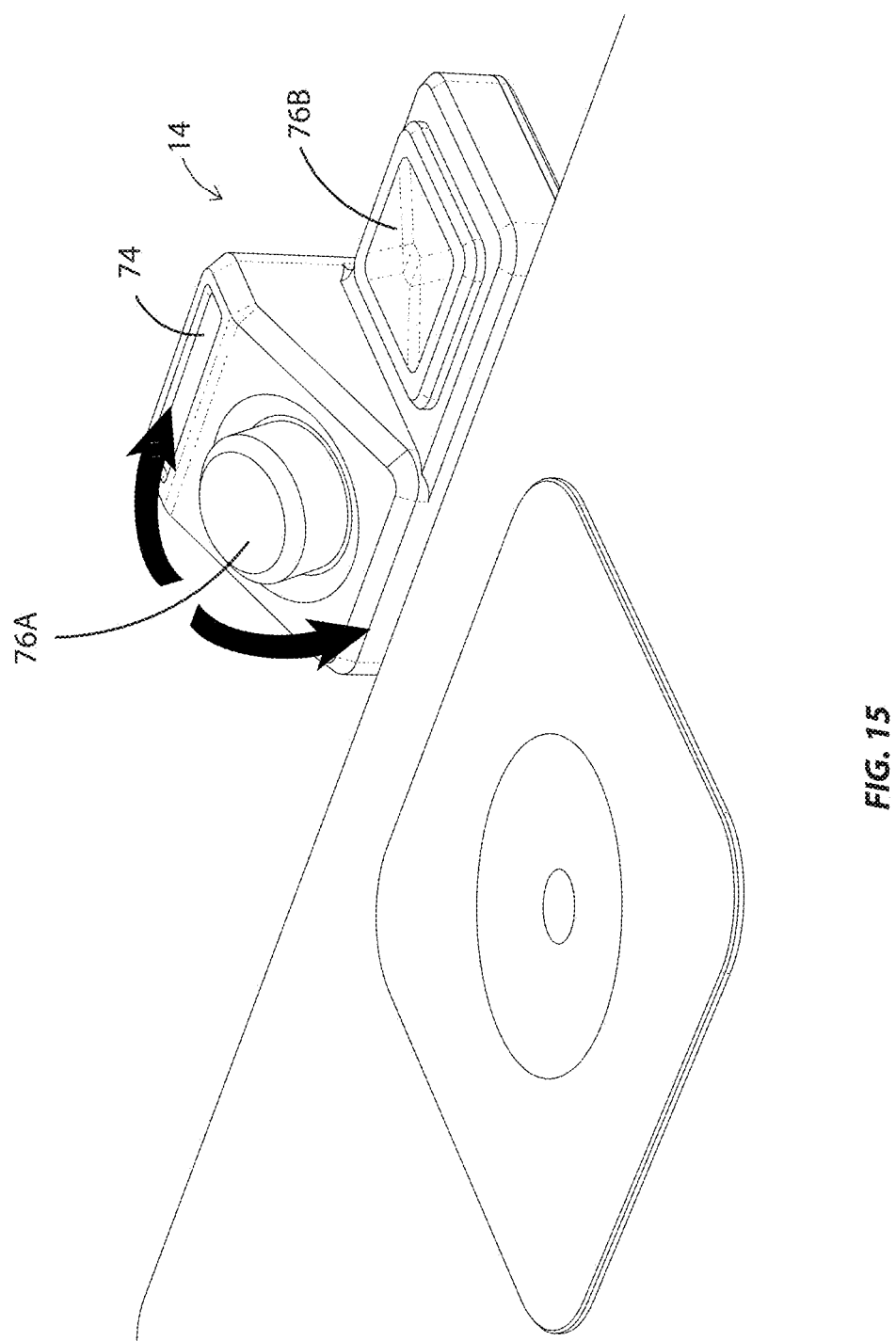

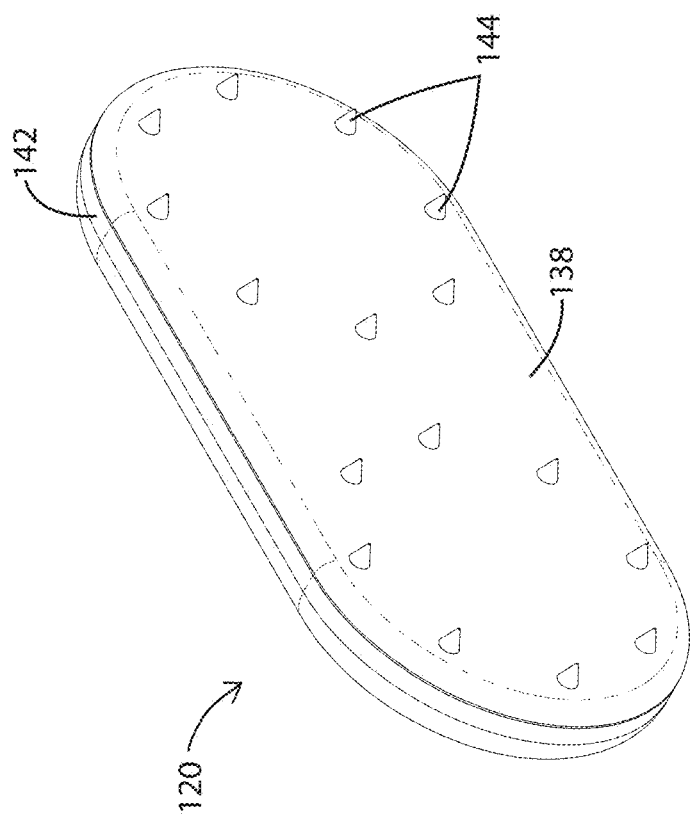

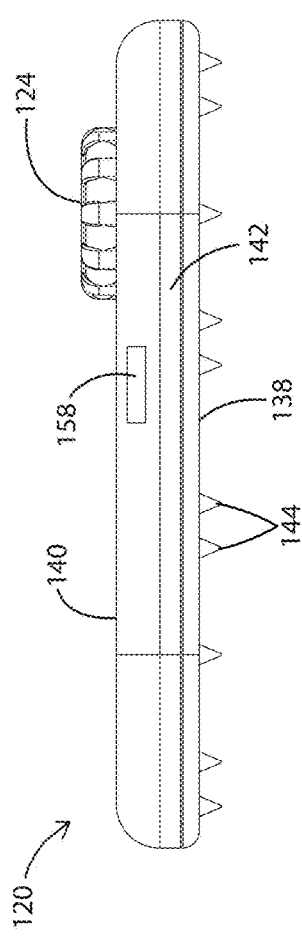
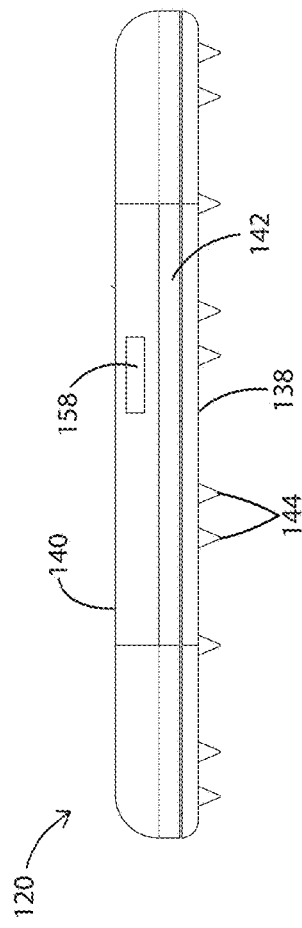

OBJECT POSITIONING SYSTEM

CROSS-REFERENCE TO RELATED APPLICATION n/a

STATEMENT REGARDING FEDERALLY SPONSORED RESEARCH OR DEVELOPMENT n/a

TECHNICAL FIELD

The present invention relates to a method and system for positioning an object. Specifically, the present invention relates to a method and system for levitating an object above a surface, the position of the levitating object being controllable by a user.

BACKGROUND

There are many situations in which levitating an object, or suspending it above a reference surface, may be desirable. For example, levitating a trophy or item of memorabilia may be an attractive way to display objects of value. Further, levitating an object so all surfaces are exposed may facilitate finishing, repair, or modification of the object. Still further, a levitation system may have applicability in the sports industry.

In golf, for example, a wooden or plastic tee is typically used to position the ball at a certain height above the ground to encourage proper swing of the club. Although most frequently used when hitting with a driver, hybrid, long iron, or fairway wood, such a device may also be used when hitting with a short iron or pitching wedge. However, the ideal ball height may differ for each of these clubs and between individual golfers. A golf ball may be positioned on a conventional tee at various heights, but it may be difficult for a golfer to accurately identify the proper height. Additionally, if a particular golfer's ideal ball height is different than the typical recommended height, the golfer may have trouble remembering his or her preferences. Finally, some golfers may not know the correct height for the club being used or for their particular swing.

During practice, a golfer may hit hundreds of golf balls at a driving range. If the balls are teed, this requires the golfer to bend over and position the ball every time one is hit. This is not only time consuming, but the repeated bending can quickly take a toll on the golfer's back, knees, and hips. Teeing balls may also present a burden to groundskeepers, course owners, and other maintenance professionals. All debris, including tees, must be removed before a tee box can be mowed or otherwise maintained. Again, this becomes very time consuming and some tees, especially the plastic products, can damage maintenance equipment. When it is considered that most courses include at least eighteen holes with two or more tee boxes, the impact of tees on course maintenance costs is quickly realized.

SUMMARY

The invention advantageously provides a system and method for levitating an object to a desired height above a reference surface. In one embodiment, a system for levitating an object above a surface includes a user input device, a power source in communication with the user input device, an engagement platform a magnet array proximate the engagement platform, the magnet array having a plurality of electromagnets and a permanent magnet, the magnet array being in communication with the power source, and processing circuitry in communication with the user input device. In one aspect of this embodiment, the magnet array includes a central electromagnet, a plurality of peripheral electromagnets, and a permanent magnet. In one aspect of this embodiment, the permanent magnet is an annular permanent magnet having an aperture. In one aspect of this embodiment, the plurality of peripheral electromagnets has a radially symmetrical configuration about the central electromagnet and all of the central and peripheral electromagnets are located within the aperture of the permanent magnet.

In one aspect of this embodiment, the central electromagnet and the plurality of peripheral electromagnets are configured to exert a composite magnetic force having a first magnitude in a first direction and the permanent magnet is configured to exert a magnetic force having a second magnitude in a second direction at least substantially opposite the first direction. In one aspect of this embodiment, the base further includes a housing having a first plate, a second plate opposite the first plate; and a frame between the first plate and the second plate. In one aspect of this embodiment, the magnet array and processing circuitry are located within the frame. In one aspect of this embodiment, the second plate includes an engagement platform, the second direction extending at least substantially orthogonally from the second plate.

In one aspect of this embodiment, the power source is configured to deliver an adjustable current to the magnet array, the magnet array being located beneath the engagement platform such that the magnetic force exerted by the central electromagnet and the plurality of peripheral electromagnets at least partially controls a levitation height of the at least substantially spherical object above the base. In one aspect of this embodiment, the user input device is configured to adjust an amount of current delivered from the power source to the magnet array, increasing the amount of current causing the levitation height to decrease and decreasing the amount of current causing the levitation height to increase. In one aspect of this embodiment, the power source is configured to be selectively activated and deactivated and the processing circuitry is programmed to put the system in standby mode when the power source is activated and when no object is on the engagement platform, the first magnitude being greater than the second magnitude when the system is in standby mode.

In one aspect of this embodiment, the system further includes a housing, the user input device, the power source, the magnet array, and the processing circuitry all being at least partially located within the housing. In one aspect of this embodiment, the user input device is configured to receive a height selection made by a user. In one aspect of this embodiment, the user input device is a dial, the dial being retractable within the housing, retraction of the dial activating the power source. In one aspect of this embodiment, the housing includes an upper surface, the engagement platform being defined by the upper surface of the housing.

In one aspect of this embodiment, the housing includes an upper surface, a lower surface, and a longitudinal axis, the upper surface including an aperture, the engagement platform being sized to pivotably move within the aperture about the housing longitudinal axis. In one aspect of this embodiment, the engagement platform includes an upper surface and a lower surface, the magnet array being coupled to the lower surface of the engagement platform. In one aspect of this embodiment, the system further comprises a counterweight, the counterweight being coupled to the engagement platform such that the engagement platform maintains an at least substantially horizontal position relative to the housing.

In one embodiment, system for controlling a height of a levitated object based on a height selection made by a user includes: a user input device being configured to receive the height selection made by the user; a base in communication with the user input device, the base including: a magnet array having a central electromagnet configured to exert an adjustable magnetic force in a first direction, a plurality of peripheral electromagnets each being configured to exert an adjustable magnetic force in the first direction, and a permanent magnet being configured to exert a non-adjustable magnet force in a second direction at least substantially opposite the first direction; processing circuitry in communication with the user input device; and a housing having an engagement platform, the second direction extending at least substantially orthogonally from the engagement platform; and a power source in communication with and being configured to deliver an adjustable current to the magnet array, the magnet array being located beneath the engagement platform such that the magnetic force exerted by the central electromagnet and the plurality of peripheral electromagnets at least partially controls a levitation height of the at least substantially spherical object above the engagement platform, the user input device being configured to adjust an amount of current delivered from the power source to the magnet array based on the height selection made by the user, the user input device being configured to increase the amount of current to decrease the levitation height and to decrease the amount of current to increase the levitation height.

In one embodiment, a system for levitating an at least substantially spherical object includes: a user input device; a base in communication with the user input device, the base including: a magnet array having a central electromagnet configured to exert an adjustable magnetic force in a first direction, a plurality of peripheral electromagnets each being configured to exert an adjustable magnetic force in the first direction, and an annular permanent magnet having an aperture, the permanent magnet being configured to exert a non-adjustable magnet force in a second direction at least substantially opposite the first direction; a magnet array mounting plate, the magnet array being coupled to the magnet array mounting plate such that the plurality of peripheral electromagnets have a radially symmetrical configuration about the central electromagnet and all of the central and peripheral electromagnets are within the aperture of the permanent magnet; at least one printed circuit board having processing circuitry and at least one wireless communication component, the processing circuitry being in communication with the user input device; and a housing having a first plate, a second plate opposite the first plate, and a frame between the first plate and the second plate, the magnet array, magnet array mounting plate, and at least one printed circuit board being located within the frame, the second plate including an engagement platform, the second direction extending at least substantially orthogonally from the second plate, the first plate, the second plate and the frame each having a diameter, the diameter of the first and second plates being at least substantially the same, the diameter of the frame being less than the diameter of each of the first and second plates; and a power source in communication with the user input device and the base and being configured to deliver an adjustable current to the magnet array, the magnet array being located beneath the engagement platform such that the magnetic force exerted by the central electromagnet and the plurality of peripheral electromagnets at least partially controls a levitation height of the at least substantially spherical object above the engagement platform, the user input device being configured to adjust an amount of current delivered from the power source to the magnet array, increasing the amount of current causing the levitation height to decrease and decreasing the amount of current causing the levitation height to increase.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIGS. 12 and 13 show a relationship between magnetic force vectors and an object's position;

FIGS. 14-19 show steps in an exemplary method of using the object positioning system;

FIG. 21 shows a bottom perspective view of the object positioning device of FIG. 20;

FIG. 22 shows a side view of the object positioning device of FIG. 20 with the user input device being extended from the housing;

FIG. 23 shows a side view of the object positioning device of FIG. 20 with the user input device being retracted within the housing;

DETAILED DESCRIPTION

Figure 1:
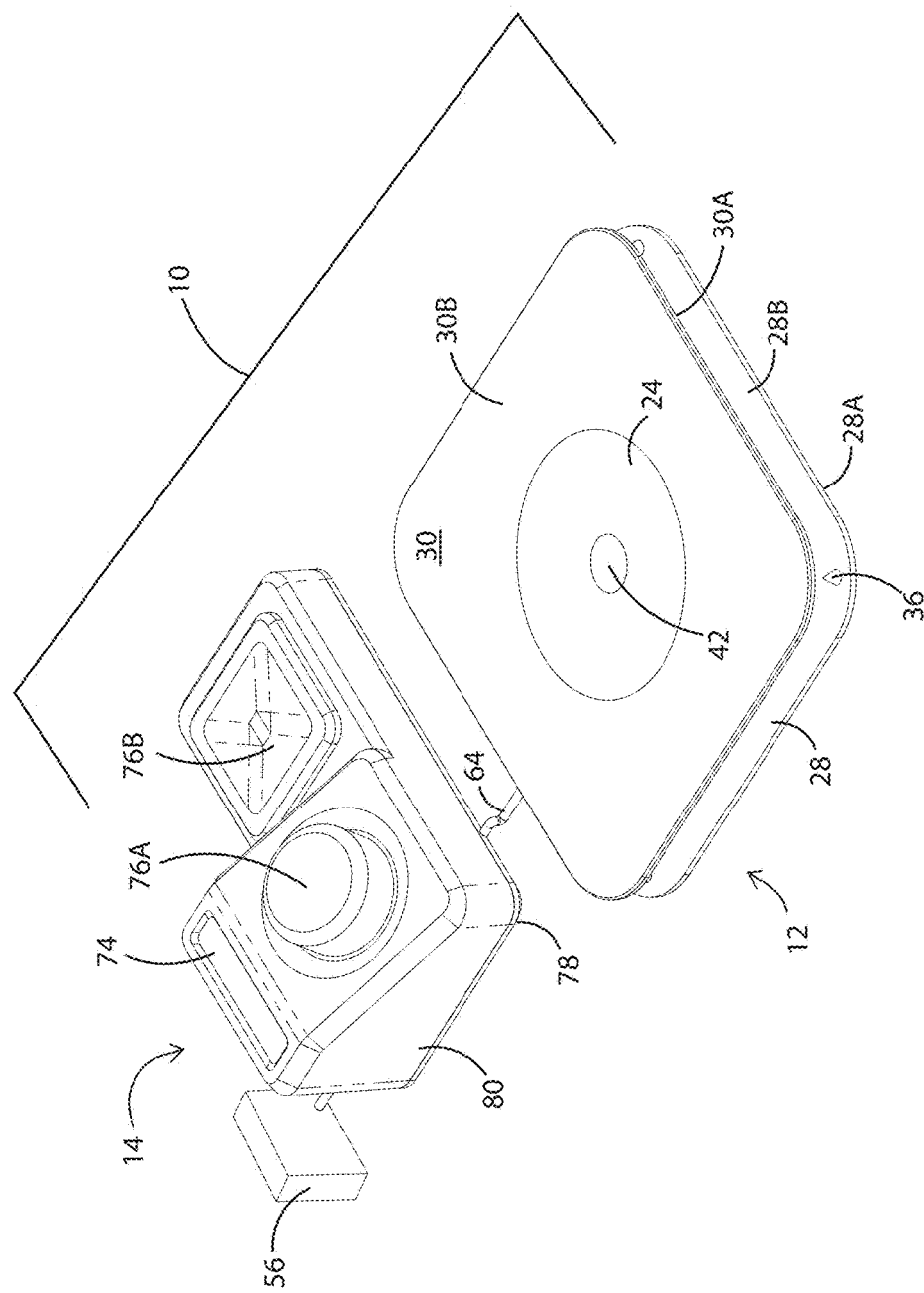
FIG. 1 shows an embodiment of an object positioning system, the system including a base and user input device.

The invention advantageously provides a system and method for levitating an object to a desired height above a reference surface. For example, the object may be magnetized and/or include a magnet or magnetized component. Levitation of the object may be achieved by the opposing magnetic forces exerted on the object by a permanent magnet and a plurality of electromagnets. Further, the object's height may be controlled by the user through a user input device, such as a food pedal, computer, mobile telephone application, or the like.

Before describing in detail exemplary embodiments that are in accordance with the disclosure, it is noted that components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top," "bottom," "upper," "lower," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an," and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designations refer to like elements, an embodiment of an object positioning system constructed in accordance with the principles of the invention is shown in the figures and generally designated as "10." The object positioning system 10 generally includes a base 12 and a user input device 14. As is discussed in more detail below, the base 12 may be in wired or wireless communication with the user input device 14. The system 10 may be configured to levitate an object 16, such as an at least substantially spherical object that is magnetized and/or contains a magnet and/or magnetized components. As a non-limiting example, the object 16 may be a golf ball containing magnetized components.

Referring now to FIGS. 1-5, an embodiment of the object positioning system is shown. The base 12 may include a housing 18, at least one printed circuit board (PCB) 20, a magnet array 22, and an engagement platform 24. The housing may include a first (or lower) plate 28, a second (or upper) plate 30, and a frame 32 therebetween. The frame 32 may be coupled to the first 28 and second 30 plates using any suitable means, including, but not limited to, screws, welding, soldering, adhesives, engagement elements, snaps, clamps, friction fitting, or the like. The first 28 and second 30 plates may each have the same maximum diameter, and this diameter may be greater than the maximum diameter of the frame 32. As a non-limiting example, the first 28 and second 30 plate may each have a diameter of approximately 9 inches (±0.5 inch), whereas the frame 32 may have a diameter of approximately 7.5 inches (±0.5 inch). Further, the frame 32 may have a height that is approximately a height of a piece of material that is sandwiched between the first 28 and second 30 plates. The first plate 28, the second plate 30, and the frame 32 may each be of any suitable size, shape, and/or configuration, but in one embodiment each may have an at least substantially square shape with rounded corners (as shown in FIGS. 1-4).

Each of the first plate 28 and the second plate 30 may have a first (or lower) surface 28A, 30A and a second (or upper) surface 28B, 30B. For example, the frame 32 may be secured between the second surface 28B of the first plate 28 and the first surface 30A of the second plate 30. As is discussed in greater detail below, opposing surfaces of the first 28 and second 30 plates may include one or more engagement elements 36 for securing the base 12 to a section of material 38, such as artificial turf. The first 28 and second 30 plates each may be composed of a first material with an overmold of a second material, the second material having a lower durometer than the first material. For example, the first and second plates may be composed of a rigid material such as high-density polyethylene (HDPE) with an overmold of a thermoplastic elastomers (TPE) or thermoplastic rubber (TPR). Alternatively, the plates 28, 30 may be composed of a single durable material, such as plastic.

Figure 5:
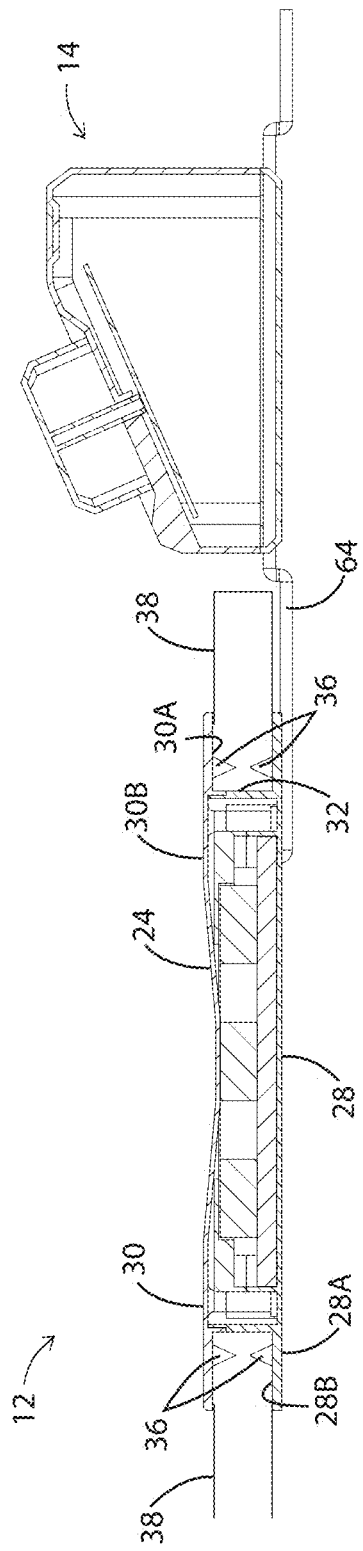
FIG. 5 shows a cross-sectional view of the object positioning system of FIG. 1.

The second plate 30 may include the engagement platform 24. The engagement platform 24 may be concave or dimple-shaped (as shown in FIG. 5). That is, the engagement platform 24 may have an indentation, dimple, or cup shape that is sized and configured to support the object therein when the object is not being levitated by the magnet array 22. As a non-limiting example, the engagement platform 24 may be at least substantially circular concave disk with a depth of approximately 0.25 inch. The engagement platform 24 may be composed of the same materials as the first 28 and second 30 plates. In addition to or instead of those materials, the engagement platform 24 may include or be composed of a softer material, such as rubber and/or silicone. Additionally, the engagement platform 24 may include at least one sensor 40 that allow the system to determine whether an object has been placed on the engagement platform 24. For example, the at least one sensor 40 may include an optical sensor, a pressure sensor, or the like. It will be understood that the at least one sensor 40 may be in more than one location, and may or may not be at the location shown in dashed lines in FIG. 3. For example, the system 10 may include a sensor on or beneath the engagement platform 24 and/or a sensor elsewhere on or in the base 12. The engagement platform 24 may further include an indicator light 42, such as a light-emitting diode (LED), that indicates to the user that the system is in standby mode and ready for the ball to be placed on the engagement platform 24.

Figure 3:
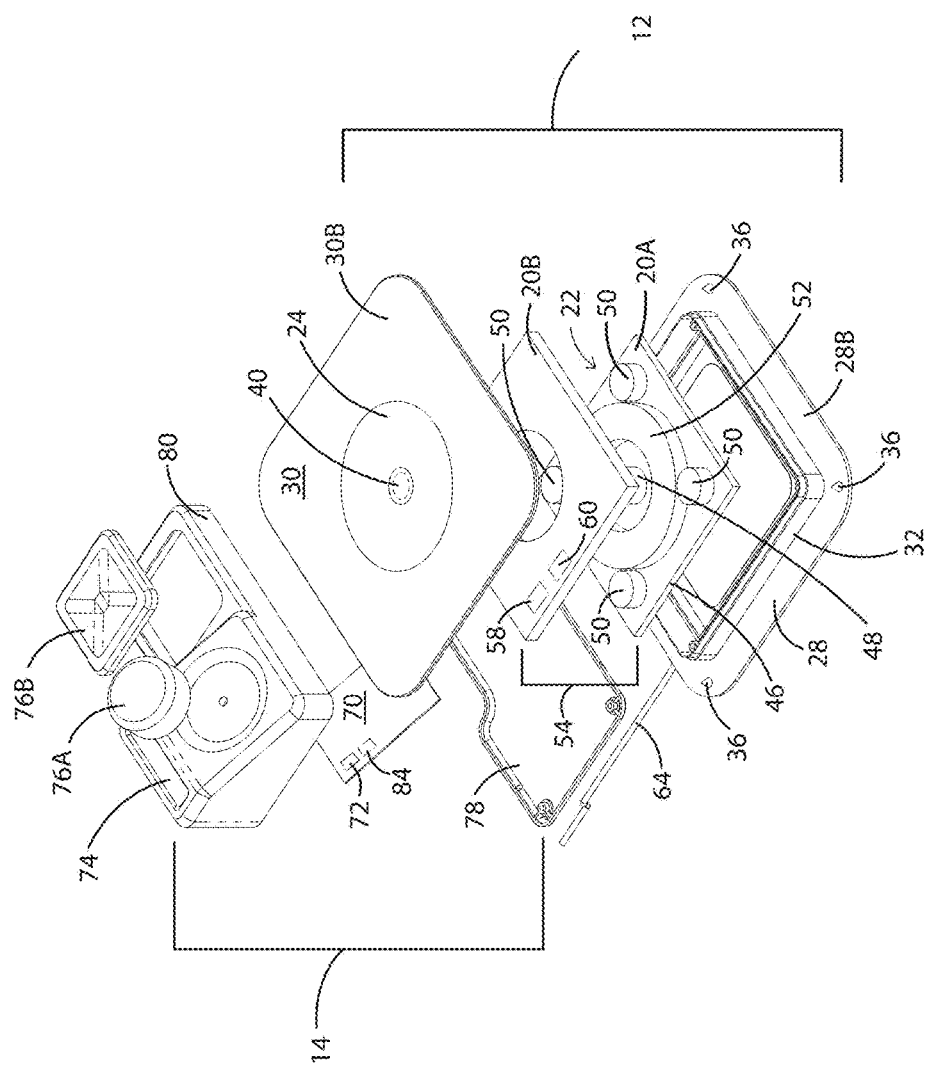
FIG. 3 shows a front perspective expanded view of the object positioning system of FIG. 1.
Figure 4:
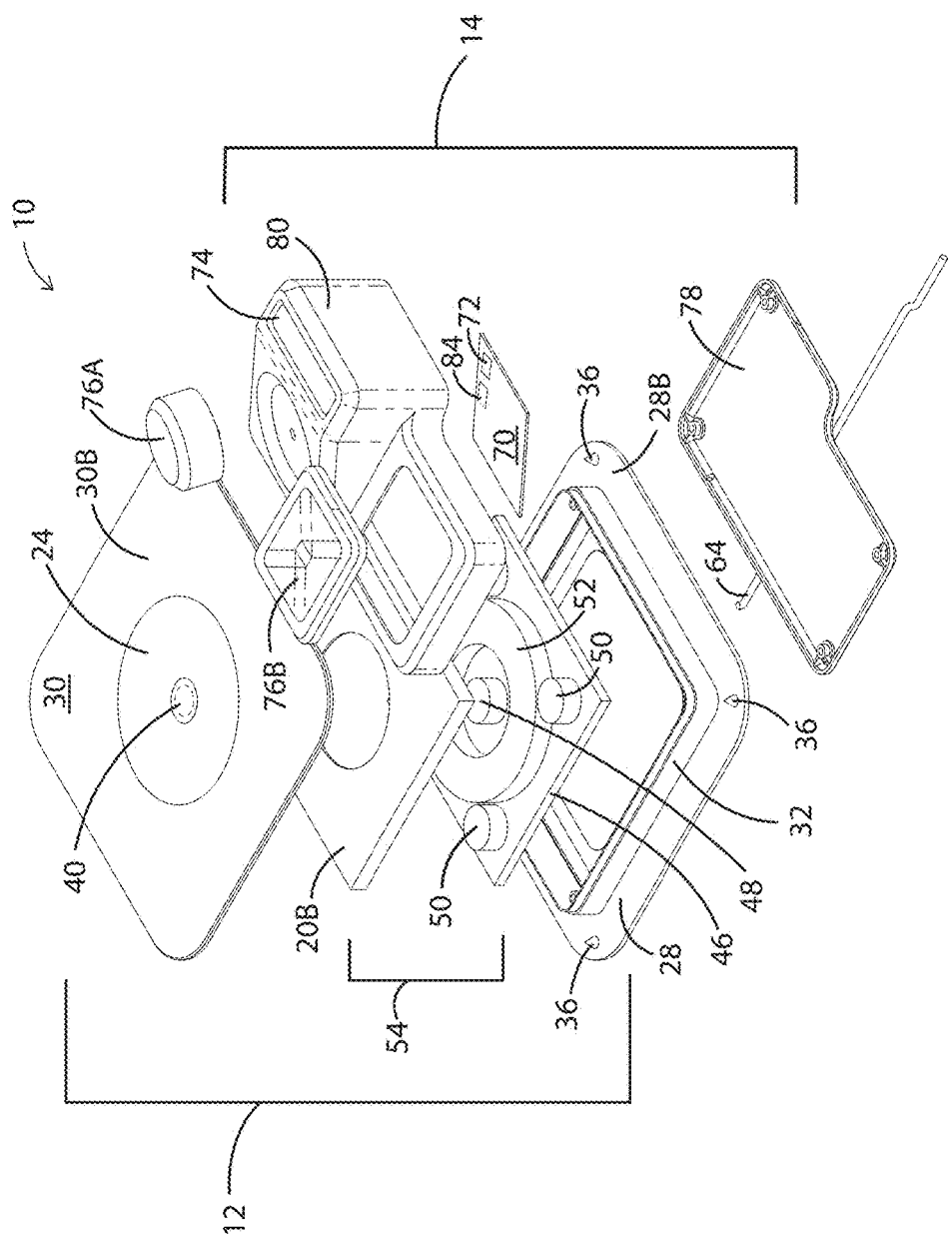
FIG. 4 shows a rear perspective expanded view of the object positioning system of FIG. 1.
Figure 10:
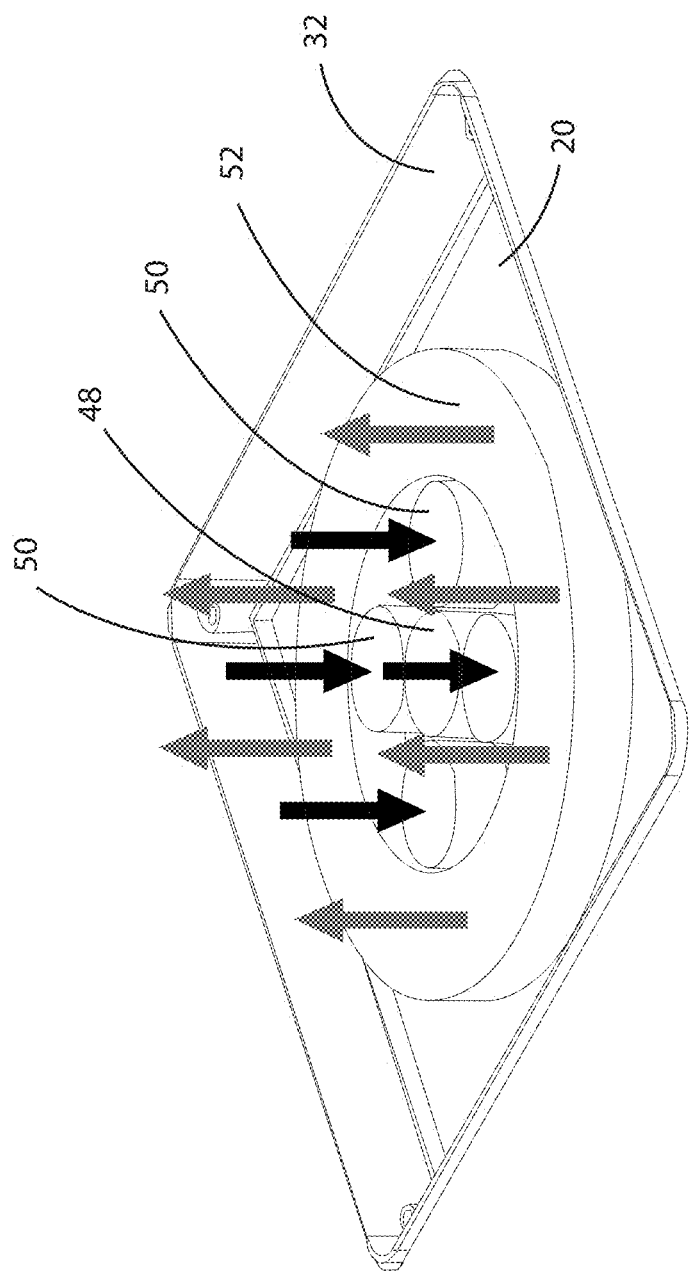
FIG. 10 shows directionality of magnetic force vectors exerted by the object positioning system.
Figure 11:
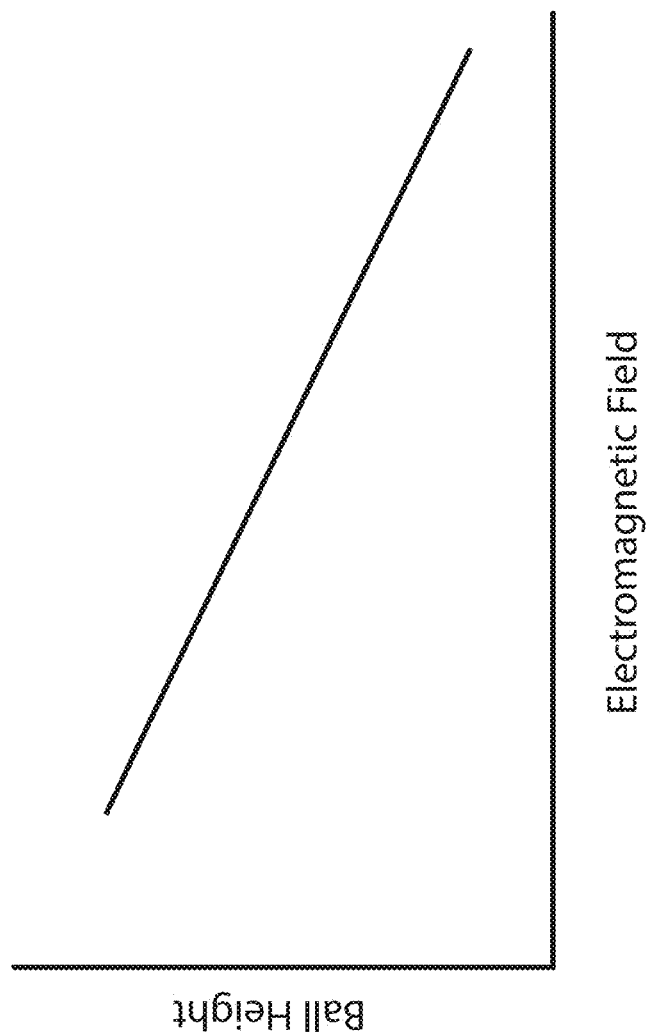
FIG. 11 shows a diagram of a relationship between a strength of a magnetic field of a plurality of electromagnets and a levitation height of an object.

The magnet array 22 may include a mounting plate 46, a central electromagnet 48, a plurality of peripheral electromagnets 50, and at least one permanent magnet 52. In a non-limiting example, the at least one permanent magnet 52 may be a magnet shaped like an annular disk having an aperture, and the central electromagnet 58 may be attached to the mounting plate 46 within the aperture of the permanent magnet 52 (for example, as shown in FIGS. 3 and 4). Further, the plurality of peripheral electromagnets 50 may be attached to the mounting plate 46 in a radially symmetrical configuration, which may enhance the stabilizing effect of the peripheral electromagnets 50 on the object. As a non-limiting example, the plurality of peripheral electromagnets 50 may include four electromagnets located approximately 90° from each other. As shown in FIGS. 10, 12, and 13, each of the electromagnets 48, 50 may exert an adjustable magnetic force in a first direction that is at least substantially orthogonal (and directed toward) to the plane in which the second plate 30 lies, and the permanent magnet 52 may exert a non-adjustable magnetic force in a second direction that is at least substantially opposite the first direction (and that is directed away from the plane in which the second plate 30 lies). Further, the circumference of the radial arrangement of the peripheral electromagnets 50 may be sized so that the magnetic fields exerted by the peripheral electromagnets 50 extend across the object's entire diameter. For example, if the object is a golf ball having a diameter at its equator, the peripheral electromagnets 50 may be spaced such that the magnetic fields they exert extend across the ball's diameter at any rotational degree. In other words, the peripheral electromagnets 50 should be able to exert a pull force over an area that includes at least substantially the entire area of the object.

In order to have a magnetic effect on the object, the magnet array 22 may be located immediately beneath, in contact with, or proximal to a lower surface of the engagement platform 24 (which may, in some embodiments, be defined by the first surface 30A of the second plate 30). The magnet array 22 may also be located proximate the at least one PCB 20. In a non-limiting example, the system 10 may include a first PCB 20A and a second PCB 20B, the magnetic array 22 being secured between the first and second PCBs (as shown in FIGS. 3 and 4). In this configuration, the first PCB 20A may function as the magnet array mounting plate. The magnet array 22 and the at least one PCB 20 collectively may be referred to as the core assembly 54, and this core assembly 54 may be housed or secured within the frame 32, between the first 28 and second 30 plates. The core assembly 54 may be in electrical communication with the user input device 14 and a power source 56. The power source 56 (shown symbolically in FIG. 1) may be an external power source, such as an electrical outlet, and/or may be an internal power source, such as a battery.

The at least one PCB 20 may include a plurality of components required to allow the device to operate as disclosed herein. For example, the at least one PCB may include processing circuitry 58 (shown symbolically in FIG. 3) including a memory and a processor, the memory being in communication with the processor and having instructions that, when executed by the processor, configure the processor to activate the magnet array, receive information from other system components (for example, the user input device 14), or perform other functions. Additionally, the PCB 20 may include one or more wireless communication components 60 (shown symbolically in FIG. 3), such as a radiofrequency identification (RFID) tag and/or antenna that can be read and/or store information for reading by, for example, an RFID tag and/or antenna in the user input device 14 and/or the object 16. As a non-limiting example, the PCB 20 may include an RFID antenna that is configured to transmit radiofrequency (RF) signals and transceiver that is configured to receive and interpret data from a passive RFID tag (for simplicity, these may be collectively referred to as the "RFID antenna"). Alternatively, the PCB 20 may include an RFID transceiver that is configured to receive and interpret data from an active RFID tag. The processing circuitry 58 may assist with the interpretation and processing of received signals. The object 16 may include an RFID tag, as discussed below. In this configuration, the base 12 may be able to detect the presence of an object 16 for automatic activation and deactivation of the magnet array 22, storing data about the object 16, or the like. Additionally, in a non-limiting example in which the object is a golf ball, the user may use golf clubs each having a unique RFID tag affixed thereto. Each tag may communicate to the base 12 a desired levitation height based on user preference, club type, or other parameters. For example, if the user is using a driver, the RFID tag on that driver may communicate to the base 12 that the desired levitation height is two inches without the user having to set the levitation height through the user input device 14. When the user changes clubs, the RFID tag on the new club may communicate to the base 12 that the desired levitation height has changed to, for example, one inch, without additional user input. Additionally, using this RFID communication, the system 10 may be able to display to the user the number of balls hit with a particular club for practice drills, or a recommended levitation height based on the type of club being used. In some embodiments, the PCB 20 may be able to transmit direct instructions to the magnet array 22 regarding levitation height, activation, and deactivation without routing the signal through the user input device 14. In this case, the base 12 may also include an internal power source, such as a battery. In other embodiments, instructions transmitted by the PCB 20 may be routed through the user input device 14 so a power source within or connected to the user input device 14 may deliver current to the magnet array 22. As an addition or alternative to RFID technology, the base PCB 20 may be configured for use with a variety of wireless protocols. For example, the PCB 20 may include a BLUETOOTH® chip (Bluetooth Sig, Inc., Delaware), infrared wireless components, ultra wideband components, induction wireless components, or other wireless communication components for the short-range wireless communication between the base 12 and the object 16 and/or the user input device 14.

Figure 2:
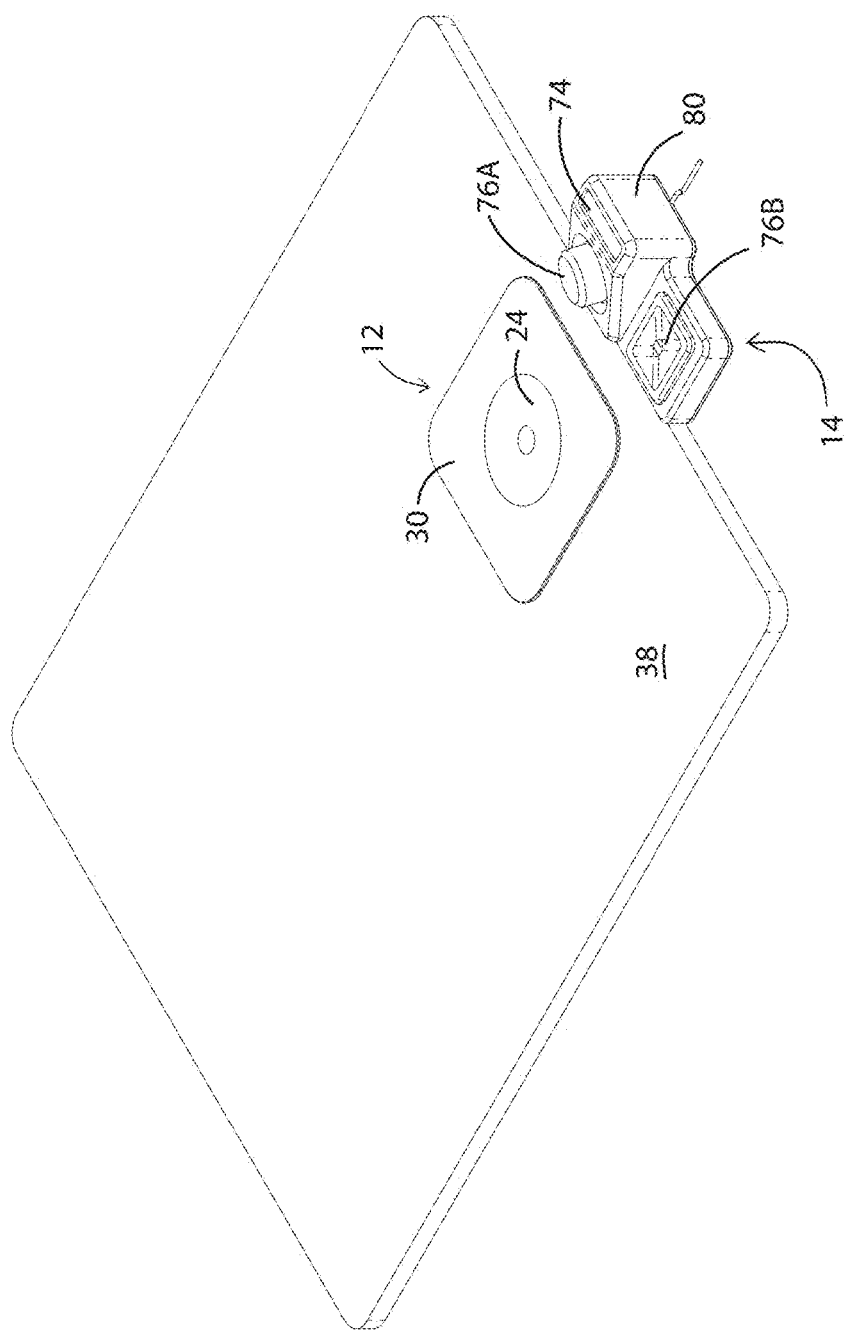
FIG. 2 shows the object positioning system of FIG. 1, coupled to a section of artificial turf.

As shown in FIGS. 2 and 5, opposing surfaces of the first 28 and second 30 plates may include one or more engagement elements 36 for securing the base 12 to a section of material 38, such as artificial turf. As a non-limiting example, the second surface 28B of the first plate 28 and the first surface 30A of the second plate 30 may each include one or more engagement elements 36 at the corners of the plates that are configured to bite into or otherwise engage a section of artificial turf 38. The artificial turf 38 may include a first (or lower) layer of rubber or other soft, flexible material and a second (or upper) layer of synthetic material that mimics turfgrass or is otherwise suitable for the particular sport for which the device is used. The engagement elements 36 may be spikes, teeth, or protrusions that are capable of penetrating at least partially within the first and second layers of the artificial turf 38. In this manner, the artificial turf 38 may be secured between the first 28 and second 30 plates of the base 12 and prevented by the engagement elements 36 from movement relative to the base 12. The artificial turf 38 may also abut at least one side of the frame 32 (as shown in FIG. 5). Alternatively, the first plate 28 of the base may be secured to a mounting surface (such as concrete, rubber, wood, or other surface) using one or more screws, pegs, snaps, clamps, rubber portions for frictional engagement with the surface, with adhesives, or through similar means. An upper surface of the artificial turf or mounting surface may be considered the reference surface when determining the desired levitation height of the object.

In the embodiment shown in FIGS. 1-5, the base 12 may be in wired communication with a user input device 14. A wire 64 may be in communication with the core assembly 54 and may extend to the user input device 14, such as that shown in FIGS. 1-5. The user input device 14 may include a housing, at least one PCB 70 having processing circuitry 72, at least one display 74, and at least one control device 76.

The housing may include a lower housing panel 78 and an upper housing portion 80. The lower housing panel 78 and upper housing portion 80 may be coupled by any suitable means, including screws, friction fitting, snaps, clamps, welding, adhesives, or the like. Further, the lower housing panel 78 and the upper housing portion 80 may be composed of a rigid material such as high-density polyethylene (HDPE). Alternatively, the lower housing panel 78 and the upper housing portion 80 may be composed of a first material with an overmold of a second material, the second material having a lower durometer than the first material. For example, the lower housing panel 78 and upper housing portion 80 may be composed of a rigid material such as high-density polyethylene (HDPE) with an overmold of a thermoplastic elastomers (TPE) or thermoplastic rubber (TPR). However, it will be understood that the user input device housing may have any size and configuration, and may be composed of any material(s), that is/are suitable for levitating a particular object 16 and are not necessarily limited to those described herein.

The upper housing portion 80 may include one or more apertures or engagement portions for the attachment or inclusion of the at least one display 72 and the at least one control device 74. For example, the upper housing portion 80 may include a recessed portion within which a dial or knob 74A may be rotatably seated. Rotation of the dial 74A may be communicated to the processing circuitry 72, which may then set the desired height at which the object will be levitated. This height selection may be displayed on the at least one display 74. As a further example, the upper housing portion 80 may include an aperture within which a pedal 76B may be movable disposed, such that a user may step on or otherwise exert a pressure against an upper surface of the pedal 76B to move a pedal a distance downward (that is, toward the lower housing panel) to cause the processing circuitry 72 to activate the magnet array 22 to levitate the object 16 from the surface of the engagement platform 24. Although a dial 76A and a pedal 76B are discussed with reference to FIGS. 1-5, it will be understood that the housing may include any number, type, or configuration of control devices and/or displays. As a non-limiting example, the housing may include one or more buttons, dials, switches, keyboards, touchscreens, or other components suitable for receiving input from and communicating information to the user.

Similar to the at least one PCB 20 in the base 12, the at least one PCB 70 in the user input device 14 may include or be connected to a plurality of components required to allow the device to operate as disclosed herein. For example, the at least one PCB 70 in the user input device 14 may include processing circuitry 72 including a memory and a processor, the memory being in communication with the processor and having instructions that, when executed by the processor, configure the processor, to establish a levitation height, communicate with the base 12 to activate the magnet array 22, communicate data to the user, or perform other functions. Additionally, the user input device PCB 70 may include one or more wireless communication components 84, such as a RFID tag and/or antenna that can be read and/or store information for reading by, for example, and RFID tag and/or antenna in the base 12 and/or the object. In some embodiments, the RFID tag and/or antenna within the user input device 14 may be configured to perform the functions discussed above regarding the RFID tag and/or antenna within the base 12. As an addition or alternative to RFID technology, the user input device PCB may include a BLUETOOTH® chip, infrared wireless components, ultra wideband components, induction wireless components, or other wireless communication components for the short-range wireless communication between the user input device 14 and the base 12 and/or the object 16.

Additionally or alternatively, the user input device 14 may not be as shown and described in FIGS. 1-5, but may instead be a personal device, such as a cellular phone, computer, tablet, or other handheld unit. In a non-limiting example, the user input device may be a cellular phone that runs an application for communicating with the base 12 and/or the object. The application may be programmed to allow the user to enter personal information, select desired application settings, create a log of golf clubs with levitation height preferences for each, find nearby golf courses, store visited and "wish list" golf courses, store user data, or the like. If the user input device 14 is a cellular telephone, for example, the cellular telephone may be compatible for use with an external RFID reader that can communicate with RFID tags in the base 12, object, and/or other items, such as golf clubs. Alternatively, the base 12 and/or object may include wireless communication component (transmitters and receivers) other than RFID devices, such as a BLUETOOTH® chip or other suitable alternatives. Thus, the user may be able to automatically activate, deactivate, and control the levitation height in the base 12 through his or her cellular phone without the need for additional equipment or system components.

Figure 6:
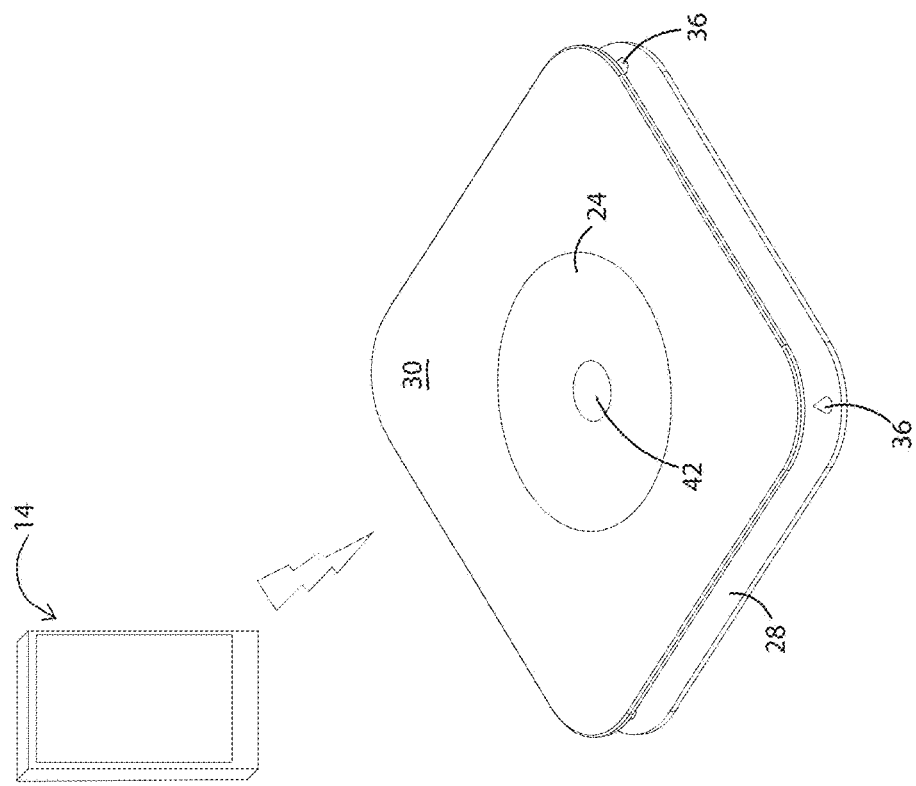
FIG. 6 shows a further embodiment of an object positioning system, the system including a base in wireless communication with a user input device.

Referring now to FIG. 6, the base 12 may be in wireless communication with the control device. As a non-limiting example, the control device 14 may be a mobile device (such as a cellular telephone). Additionally or alternatively, the control device 14 shown and described above and in FIGS. 1-5 may include one or more wireless communication components 84 that allow for wireless communication with the base 12. Thus, the base 12 may also include one or more wireless communication components 60, such as Bluetooth, for communicating with a user input device 14. Additionally, the base 12 may include RFID components as discussed regarding FIGS. 1-5.

Figure 7:
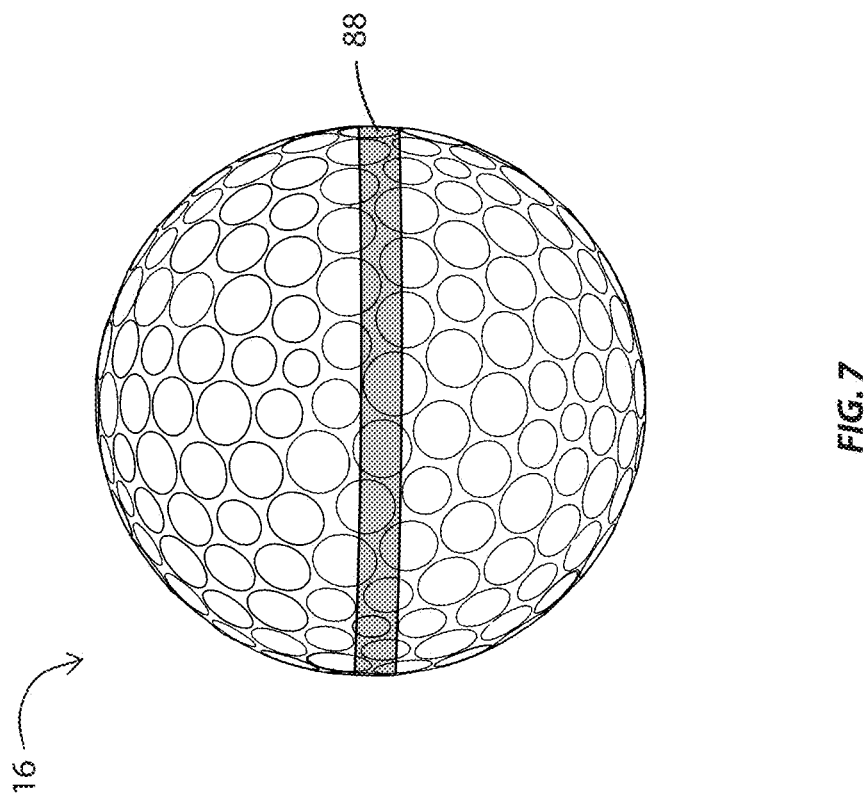
FIG. 7 shows an exemplary object for use with the object positioning system.
Figure 8:
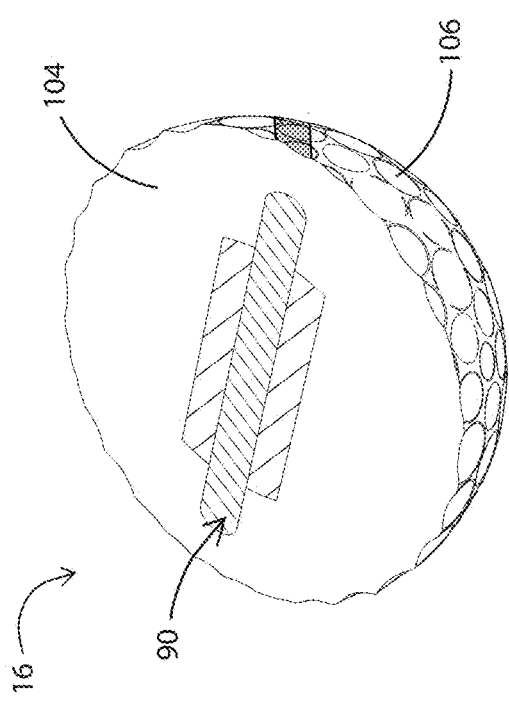
FIG. 8 shows a cutaway view of the object of FIG. 6.
Figure 9:
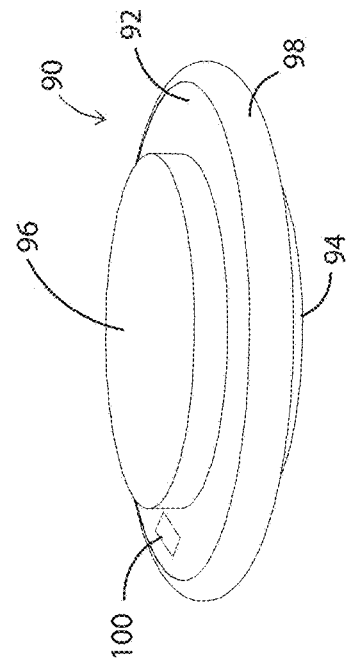
FIG. 9 shows an exemplary magnet module within the object of FIG. 6.

Referring now to FIGS. 7-9, an exemplary object for use with the object positioning system is shown. Although it will be understood that the object may be 16 any item capable of being levitated by the magnet array 22 within the base 12, the object 16 shown in FIGS. 7-9 may be a golf ball. For simplicity, the figures will be discussed with reference to a golf ball Like currently known golf balls, the ball 16 shown in FIGS. 7-9 may include a plurality of dimples on the ball's external surface, or other surface textural features known in the art. The external surface of the ball 16 may include a horizontal reference indicator 88, such as a line that extends around at least a portion of the ball's circumference. As a non-limiting example, the horizontal reference indicator 88 may extend around an entirety of the ball's circumference at the ball's widest point. This horizontal reference indicator 88 may help the user position the ball 16 on the engagement platform 24 in a way that will allow the magnet array 22 to then stably levitate the ball 16 at a height above the engagement platform 24.

Referring now to FIG. 8, a cutaway view of the golf ball is shown. The ball 16 may include within a magnet array 90 and at least one PCB 92. For example, the magnet array 90 may include a first permanent magnet 94, a second permanent magnet 96 opposite the first permanent magnet 94, and a third permanent magnet 98 (which may be referred to herein as a "balancing magnet 98") sandwiched between the first 94 and second 96 magnets. In some embodiments, the first 94, second 96, and balancing magnet 98 are each at least substantially disk shaped. Each of the magnets may have a diameter and a thickness, and in some embodiments the diameters of the first 94 and second 96 magnets may be approximately the same and the balancing magnet 98 may have a diameter that is larger than the diameters of the first 94 and second 96 magnets (as shown in FIG. 9). The third magnet 98 may also be referred to herein as a "balancing magnet 98" because the portion of the third magnet 98 that extends beyond the first 94 and second 96 magnets may provide a larger surface area for magnetic interaction with the base magnet array 22. Additionally, the magnet array 90 may be oriented within the ball 16 such that the ball 16 may be stably levitated by the base magnet array 22 in a position in which the horizontal reference indicator 88 is at least substantially parallel to the plane of the base second surface 30.

The at least one PCB 92 may be coupled to or proximate the magnet array 90 (for example, the at least one PCB 92 is shown as being between the second magnet 96 and the balancing magnet 98 in FIG. 9), or it may be elsewhere within the ball 16, located a distance from the magnet array 90. As discussed above regarding the base 12 and user input device 14, the at least one PCB 92 in the ball may include or be connected to wireless communication components 100 that are configured to place the ball 16 and base 12 and/or user input device 14 in communication. For example, the wireless communication components 100 may include RFID, BLUETOOTH®, or other suitable alternatives. For example, the wireless communication between the ball 16 and the base 12 may allow the base 12 and/or user input device 14 to determine if the ball 16 is in the correct position on the engagement platform 24 for levitation. If the system 10 determines there is no ball on the engagement platform 24, the system 10 may prevent or override activation of the magnet array 22.

The ball 16 may further include a core and one or more layers, such as a polymer layer surrounding the core and a durable plastic cover layer that forms the ball's external surface. However, it will be understood that the ball may include any number or layers, and may or may not include a core. In the non-limiting embodiment shown in FIG. 8, the object is a two-piece ball 16 that includes a core 104 composed of, for example, a natural or synthetic rubber, that is overmolded onto the magnet array 90 and at least one PCB 92. However, it will be understood that the ball 16 may be manufactured using any suitable method that allows for the ball to be manufactured with the magnet array 90, PCB 92, and any other internal components inside or to have these components added after the ball's manufacture. The ball 16 further includes an outer layer 106 composed of, for example, balata, urethane, ionomer resin, or other suitable materials, may then be formed over the core by, for example, injection molding or compression molding.

Referring now to FIGS. 10-19, a method of positioning the object is shown. FIG. 10 shows the base 12 with the second plate 30 removed and the magnet array 22 visible for illustration. The interaction of the magnetic fields of the central electromagnet 48 and each of the plurality of peripheral electromagnets 50 with the magnetic field of the magnet array 90 within the ball 16 may pull the ball 16 toward the engagement platform 24 (the engagement platform is not shown in FIG. 10). The central electromagnet 48 may have more control over the levitation position of the ball 16, but the peripheral electromagnets 50 may help stabilize the ball 16 when levitated. In contrast, the interaction of the magnetic field of the permanent magnet 52 with the magnetic field of the magnet array 90 within the ball may push the ball 16 away from the engagement platform 24. Therefore, adjusting the strength of the magnetic field of the electromagnets 48, 50 may enable control of the levitation height of the ball 16. For example, the permanent magnet 52 exerts an unchangeable and constant magnetic force against the ball 16. The electromagnets 48, 50 exert magnetic forces against the ball 16 that may be adjusted, that is, strengthened or weakened, by increasing or decreasing an amount of current (or rate of flow of electric charge) that travels through the electromagnets 48, 50, up to a point of saturation (that is, a point at which increased current does not further strengthen the magnetic field). As the magnetic fields of the electromagnets 48, 50 become stronger than the magnetic field of the permanent magnet 52, the pull force exerted by the electromagnets 48, 50 overcome the push force exerted by the permanent magnet 52, thereby causing the ball 16 to move from a higher first height $H_1$ to a lower second height H2 relative to the engagement platform 24. The increased pull force exerted by the electromagnets 48, 50 is illustrated by the field arrow 48/50 in FIG. 13 that is shorter and thicker than the field arrow 48/50 in FIG. 12. This principle is shown graphically in FIG. 11 and described in more detail with reference to FIGS. 14-19.

FIGS. 14-19 show steps in an exemplary method of using the object positioning system. In the first step shown in FIG. 14, the indicator light 42 on the engagement platform 24 may be illuminated to indicate to the user that the system 10 is in standby mode and ready for the ball 16 to be placed on the engagement platform 24. During standby mode, enough current may be supplied by the power source 56 to the electromagnets 48, 50 that the magnetic field exerted by at least the central electromagnet 48 is greater than the magnitude of the magnetic field exerted by the permanent magnet 52. Although the magnitude of the magnetic field exerted by the central electromagnet 48 may be greater than the magnitude of each of the magnetic fields exerted by the plurality of electromagnets, the magnitudes of the magnetic fields of the electromagnets 48, 50 may be of any ratio that allows the composite magnetic field exerted by the electromagnets 48, 50 to overcome the magnetic field exerted by the permanent magnet 52. As a non-limiting example, the processing circuitry 58 of the base 12 (and/or the processing circuitry 72 of the user interface device 14) may be configured and programmed such that system 10 may automatically go into standby mode whenever the power source 56 is activated and the one or more sensors 40 determine that no object is on the engagement platform 24. If the magnetic force exerted by the electromagnets 48, 50 were not sufficient to overcome the magnetic force exerted by the permanent magnet 52 at this initial stage, the push force of the permanent magnet 52 may prevent proper placement of the ball 16 and/or may cause unintended injury to the user when the ball 16 is placed on the engagement platform 24.

In the second step shown in FIG. 15, the user may specify a desired levitation height with the user input device. In a non-limiting example, the desired height may be set by rotation of a dial 76A, and the height may be displayed, on the user input device display 74. Although a dial 76A is shown in the figures, it will be understood that the at least one control device 76 may additionally or alternatively include a control device that is engageable by a golf club or the user's foot so the height can be set without the user having to bend over.

Figure 16:
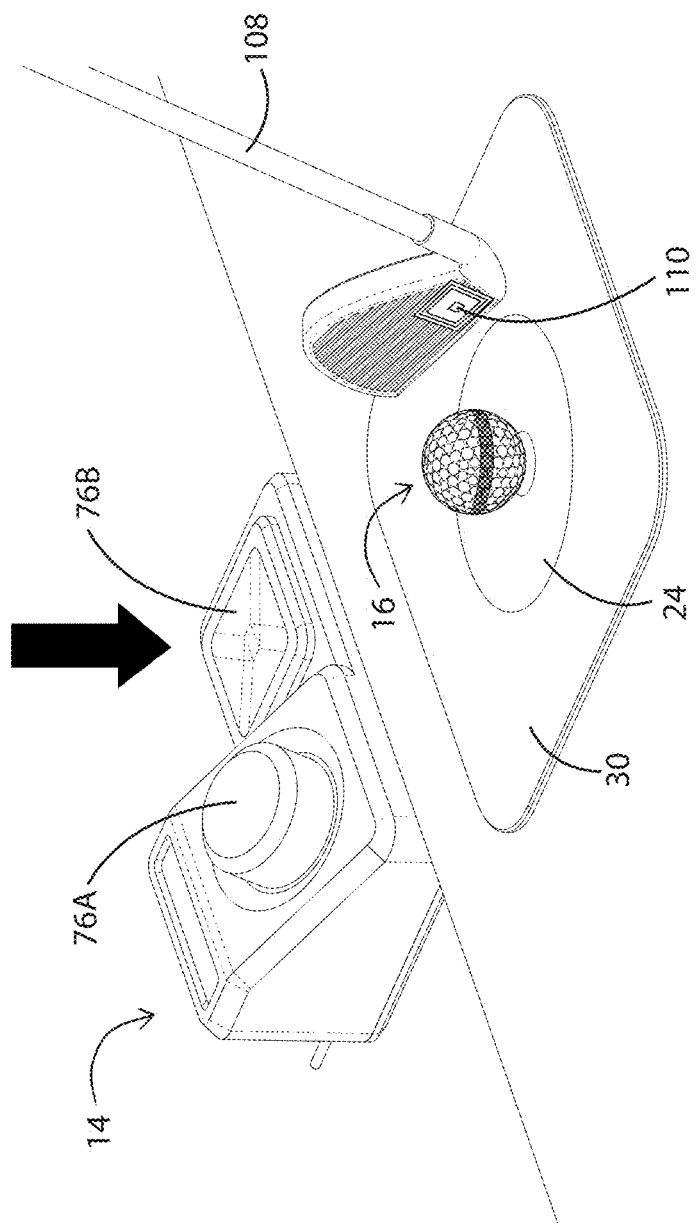

In the third step shown in FIG. 16, the ball 16 may be placed on the engagement surface 24. As the magnetic pull force exerted by the electromagnets 48, 50 on the ball may be stronger than the magnetic push force exerted by the permanent magnet 52, the ball 16 may be pulled into contact with and stabilized by the engagement surface 24. The pressure of the ball 16 against the engagement surface 24, changes in light, and/or wireless communication between the ball 16 and the base 12 may indicated to the system 10 that the ball is properly positioned on the engagement surface 24. Until the system 10 determines the ball 16 is properly positioned, the system 10 may override or prevent any instructions from the user (such as by activation of the pedal 76B) to levitate the ball 16. That is, the system 10 may maintain the magnetic force of the electromagnets 48, 50 at a level that is greater than the magnetic force of the permanent magnet 52. In a non-limiting example, this magnetic force may be maintained at the point of saturation at which increased current does not further strengthen the magnetic field.

Figure 17:
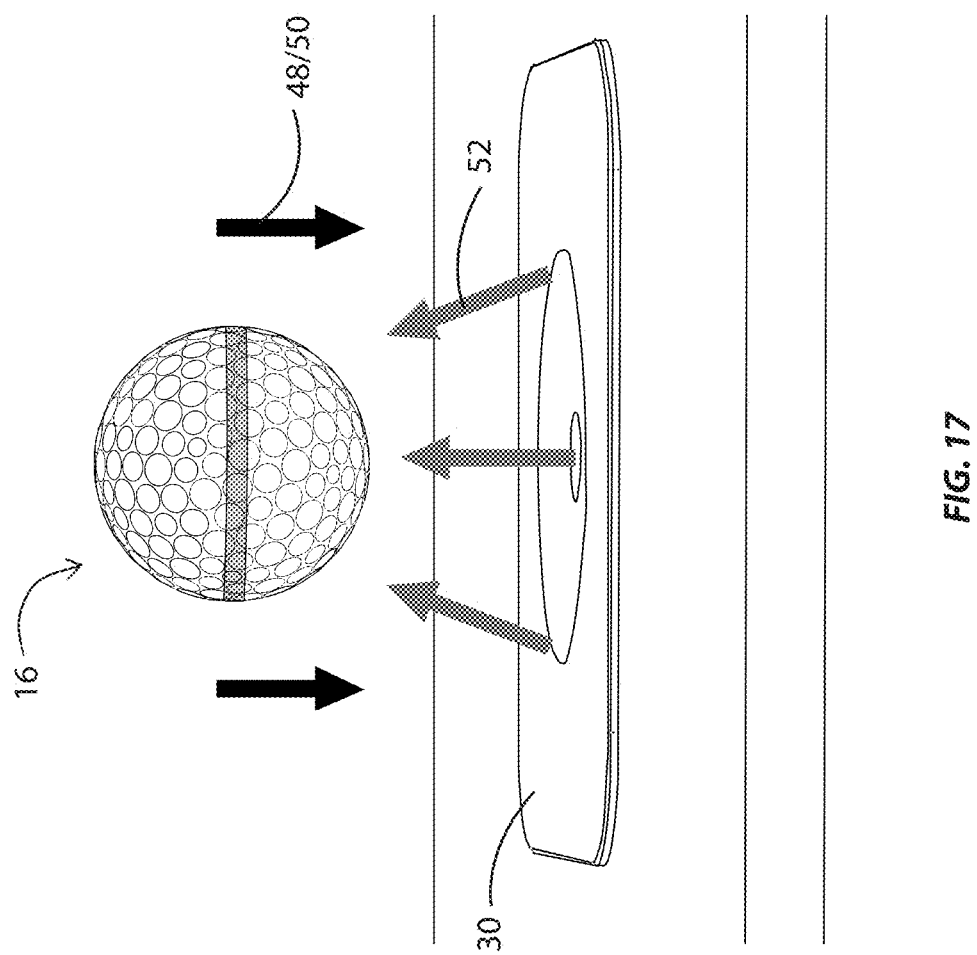

In the fourth step shown in FIG. 17, levitation is initiated. Once the ball 16 is properly positioned, the system 10 may be ready for the user to initiate levitation by, for example, activating the pedal 76B on the user input device 14. Activation of the pedal 76B may cause the processing circuitry 72 to adjust the amount of current delivered to the electromagnets 48, 50 from the power source 56. For example, the amount of current may be decreased, causing the magnetic force of the electromagnets 48, 50 to weaken relative to the magnetic force of the permanent magnet 52. As a result, the stronger permanent magnet push forces may cause the ball to lift form the engagement platform to the preset height. Once the ball 16 is levitated a distance from the engagement platform 24, the user may further adjust the height of the ball 16 using the dial 76A (or other control device) until the preferred height is established. The preferred height may be, for example, the typical height for a particular club that would be achieved using a golf ball tee.

Figure 18:
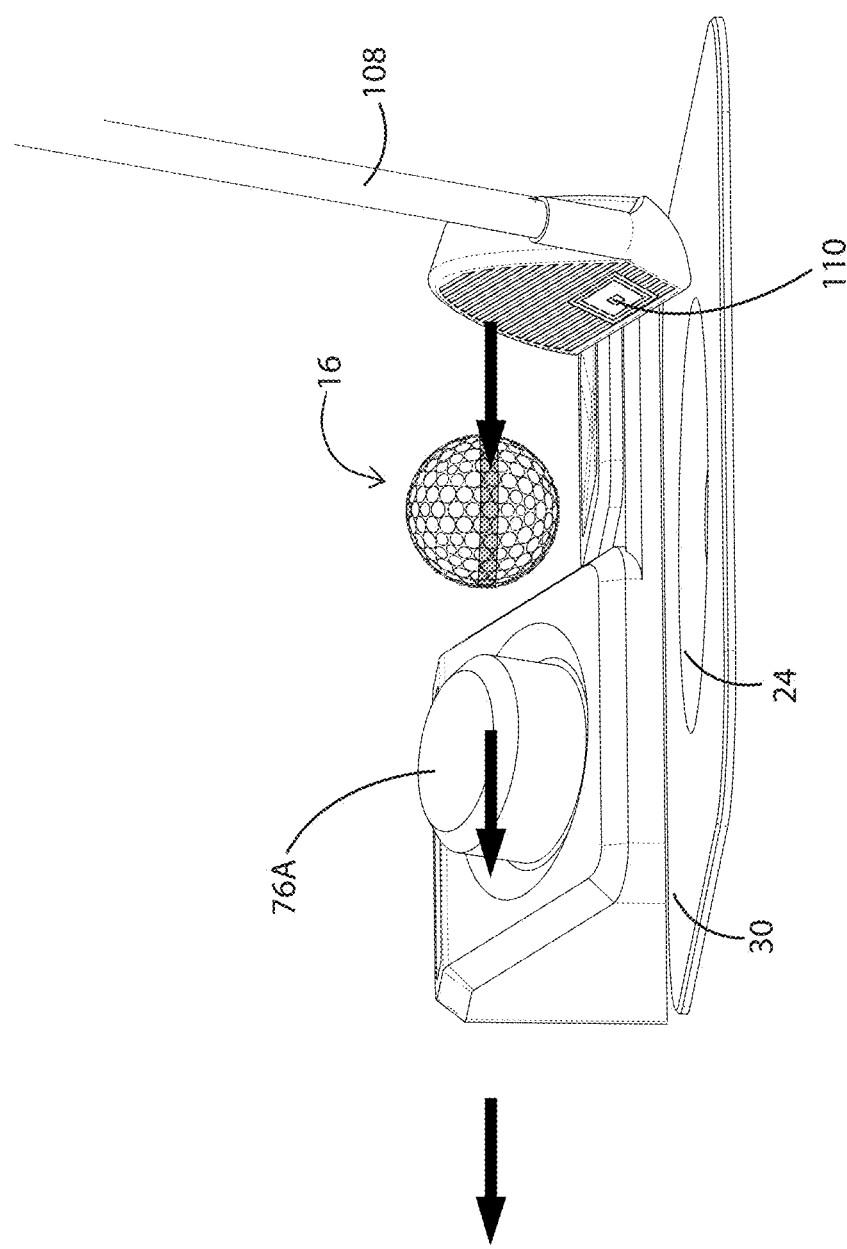

In the fifth step shown in FIG. 18, the user may strike the levitated ball with a golf club 108. As discussed above, wireless communication between the ball 16 and the base 12 and/or the user input device 14 may allow the system 10 may detect an absence of the ball 16 once the ball leaves the proximity of the base 12. Additionally or alternatively, the one or more sensors 40, such as optical sensors, may detect the absence. Still further, each club 108 may have a unique RFID tag 110 that is readable by the base wireless communication components 60 (such as the RFID antenna) and/or the user interface device wireless communication components 84.

Figure 19:
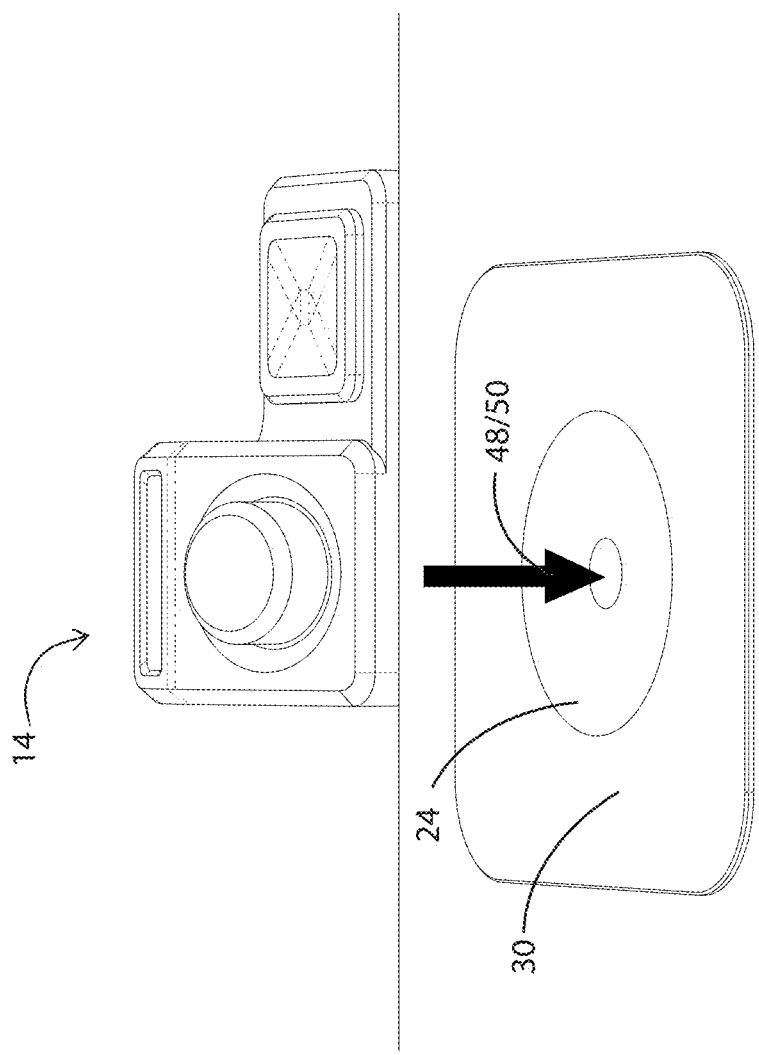
Figure 20:
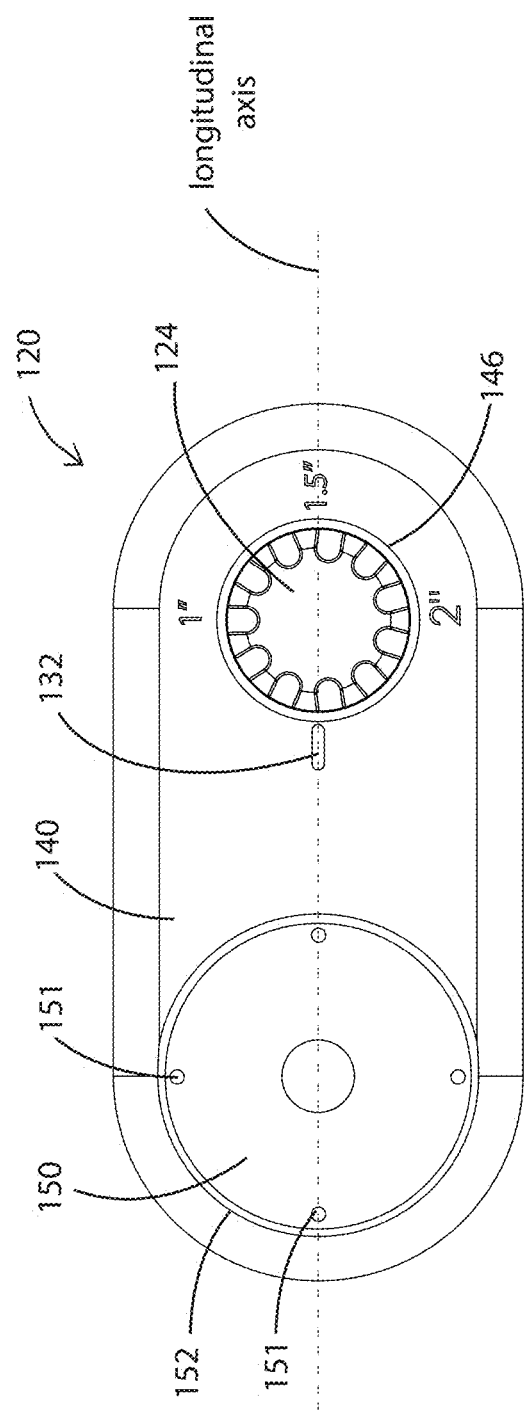
FIG. 20 shows a top view of a an embodiment of an object positioning device.

In the sixth step shown in FIG. 19, absence of a ball 16 on the engagement surface 24 or absence of the ball 16 levitated above the engagement surface 24 may cause the system 10 to enter standby mode. As a result, the indicator light 42 on the engagement platform 24 once again may be illuminated to indicate to the user that the system 10 is in standby mode and ready for the ball 16 to be placed on the engagement platform 24. These steps may be repeated as many times as is desired by the user. When the user is finished, the user may deactivate the power source 56, thereby disabling the electromagnets 48, 50. Although the permanent magnet 52 cannot be disabled like the electromagnets 48, 50, a cover (not shown) may be placed over the engagement platform 24 to prevent the magnetic interaction between the base and other objects when the device is not in use.

During operation, the ball 16 may be levitated to a height that is high enough from the reference surface (for example, the artificial turf or floor) that allows for a full swing of the club being used. For example, the user may set a levitation height that is greater when using a driver than when using a pitching wedge or short iron. Further, the concave shape of the engagement platform 24 may help prevent the club 108 from contacting the engagement platform 24 at the lowest point in the swing.

Referring now to FIGS. 20-26, an embodiment of an object positioning device is shown. Unlike the system 10 shown in FIGS. 1-6, the device 120 of FIGS. 20-22 may be entirely self contained and portable for use at multiple locations. For example, the portable device 120 could be stored in a golf bag during nonuse and then taken out for use, for example, on the fairway at locations between the tee box and the hole. Although the object positioning device 120 is referred to as being a "device," it will be understood that the term is not limiting and that the components may together be considered as a system.

The portable device 120 may generally include a housing, a control device 124, a magnet array 126, a power source 128, and at least one PCB 130. As discussed above regarding the object positioning system 10, the portable device 120 may also include one or more indicator lights 132 (for example, LEDs) or displays. The housing may be composed of a first material with an overmold of a second material, the second material having a lower durometer than the first material. For example, the housing may be composed of a rigid material such as high-density polyethylene (HDPE) with an overmold of a thermoplastic elastomers (TPE) or thermoplastic rubber (TPR). Alternatively, the housing may be composed of a single durable material, such as plastic. The housing may have a longitudinal axis, a length, a width, and a thickness. For purposes of ball height calculation, the housing thickness may be measured at the lowest point in the concave engagement platform, as discussed below.

The housing may include a first (or lower) portion 138 defining a lower surface of the device 120 and a second (or upper) portion 140 defining an upper surface of the device 120, and these portions may be coupled together either directly or at third housing portion 142 that forms a seam (as shown in FIG. 21). The first housing portion 138 may be at least substantially planar, but may include a plurality of engagement elements 144 for helping the portable device 120 to maintain its position or "grip" a surface such as turf, sand, dirt, mulch, or the like. These engagement elements 144 are shown in FIG. 21 as spikes or as having a conical shape, but it will be understood that they may be of any number, size, or configuration that is suitable for the terrain in which the portable device will be used.

The second housing portion 140 may include at least one aperture. For example, the second housing portion may include an aperture 146 through which a control device 124 may extend. In a non-limiting example, the control device may be a rotatable dial 124 by which the user may select a desired levitation height (one inch, one and a half inches, and two inches are shown as selectable heights in FIG. 20). As is shown in FIGS. 22 and 23, the dial 124 may be linearly movable relative to the portable device 120, such that the dial 124 extends a distance above or beyond the second housing portion 140 in an extended or first position and is at least substantially flush with, or not extending beyond, the second housing portion 140 when in a depressed or second position. The housing may have a longitudinal axis, and the dial's direction of linear movement may be at least substantially orthogonal to the housing longitudinal axis. The dial 124 may be configured such that the user exerts a push force on the dial's upper surface to either transition the dial from the extended position to the retracted position or transition the dial from the retracted position to the extended position. Further, the dial 124 may remain in the retracted or extended position unless or until the user pushes on the dial's upper surface.

Figure 25:
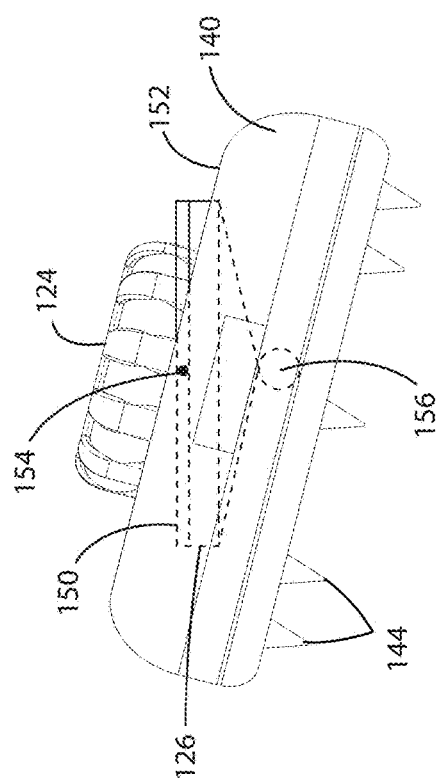
FIG. 25 shows an end view of the object positioning device of FIG. 20 with the engagement platform in a second position relative to the housing.
Figure 24:
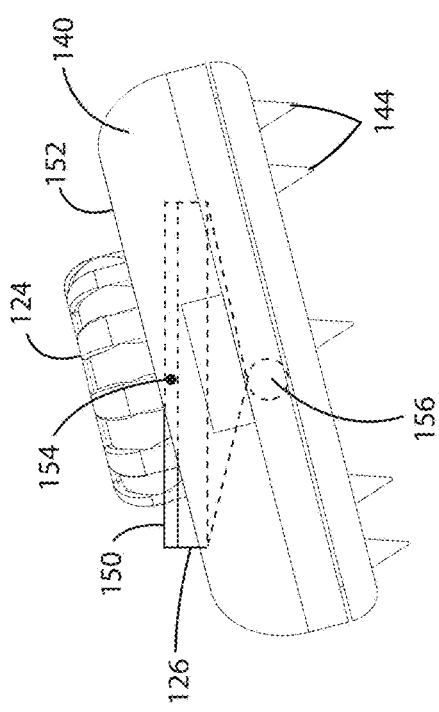
FIG. 24 shows an end view of the object positioning device of FIG. 20 with the engagement platform in a first position relative to the housing.

The housing second portion 140 may also include the engagement platform 150. The housing second portion may include one or more lights 151 on or proximate to the engagement platform 150 that can be used to illuminated the ball when the device is used in low-light conditions. The engagement platform 150 may be integral to and composed of the same materials as the housing. For example, the second housing portion 140 may include a concavity or dimple that forms the engagement platform 150. Alternatively, the engagement platform 150 may be a separate component that is coupled to or joined with the second housing portion 140. In one embodiment, the engagement platform 150 is fit within an aperture 152 in the second housing portion 140 and coupled to the second housing portion such that the engagement platform 150 is at least substantially flush with the upper surface of the second housing portion 140. In another embodiment, the engagement platform 150 may be sized to fit within an aperture 152 in the second housing portion 140, but may be movable therein relative to the second housing portion. For example, FIGS. 24 and 25 show an engagement platform 150 that is coupled to the second housing portion 140 at two pivot points 154 (only one pivot point is visible) that allow the engagement platform 150 to swivel within the aperture 152. The magnet array 126 may be sized and configured as discussed regarding FIGS. 1-19, and may be coupled to a lower surface of the engagement platform 150. The magnet array 126 may be further coupled to a counterweight 156 that helps maintain the engagement 150 platform at a horizontal position, regardless of the pitch or roll of the portable device. For example, if the portable device 120 is placed on a hill having a 20° incline, gravity acting on the counterweight 156 will maintain the engagement platform 150 at approximately 0°.

Figure 26:
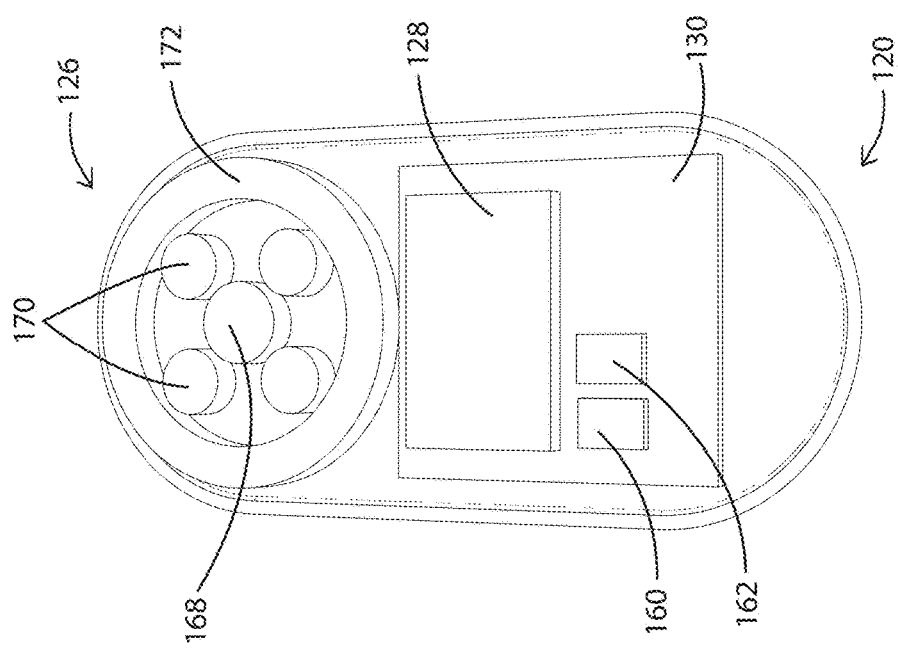
FIG. 26 shows internal components of the object positioning device of FIG. 20.

Referring now to FIG. 26, the portable device is shown with the second housing portion removed for visualization of the internal components of the device. For example, the magnet array 126 may be configured and functions similarly to the magnet array 22 shown in FIGS. 1-19. The portable device 120 may also include an internal power source 128, such as a battery. The battery 128 may be rechargeable, and the housing may include at least one plug port or receptacle 158 for connecting the battery 128 to an external power source and/or for the import or export of data. For example, the housing may include one or more Type A, Type B, Mini-A, Mini-B, Micro-A, and/or Micro-B receptacles. Further, the at least one PCB 130 may include or be connected to a plurality of components required to allow the device to operate as disclosed herein. For example, the at least one PCB in the housing of the user input device may include processing circuitry 160 (shown symbolically in FIG. 26) including a memory and a processor, the memory being in communication with the processor and having instructions that, when executed by the processor, configure the processor, to establish a levitation height, activate the magnet array, communicate data to the user, or perform other functions. The at least one PCB 130 may also include one or more wireless communication components 162 (shown symbolically in FIG. 26) that allow it to communicate with the object and/or other items, such as golf clubs. These wireless communication components 162 may be as described above regarding the system 10 of FIGS. 1-19.

During use, the magnet array 126 of the object positioning portable device 120 may function similarly to the objection positioning system 10 to levitate an object 16, such as a golf ball. Therefore, the principles behind the object levitation will not be discussed with reference to FIGS. 20-26. In a first step of a method of use, the user may activate or turn on the device 120 by depressing the dial 124 to cause the dial to transition into the extended position (if the dial is not already in the extended position). At this point, the portable device 120 may be in a standby mode, as discussed regarding FIGS. 1-19. In standby mode, the magnetic force of the central 168 and peripheral 170 electromagnets of the magnet array 126 may be increased, the magnetic force of the permanent magnet 172 may be overcome, and the ball 16 may be drawn down and into contact with the engagement platform 150. The user may then rotate the dial 124 to select a desired levitation height. Once the desired height is set, the user may then depress the dial 124 to cause the dial to transition into the retracted position. Depression of the dial 124 may gradually decrease the magnetic force of the electromagnets 168, 170, allowing the magnetic force of the permanent magnet 172 to levitate the ball 16 to the desired distance from the engagement platform 150. The ground or other surface on which the portable device 120 is placed may be considered the reference surface; therefore, the heights selectable by the dial 124 may represent the height of the ball 16 from the reference surface, rather than the height from the engagement platform 150. Further, for purposes of ball height calculation, the housing thickness may be measured at the lowest point in the engagement platform 150. For example, if the known thickness measured at the lowest point of the engagement platform 150 (which may be location of the housing having the smallest thickness measurement) is one inch and the user selects a desired height of two inches, the processing circuitry 160 may determine that the ball must be levitated to a height of one inch from the engagement platform 150. As a user's preferred ball tee height may be determined, at least in part, by the user's unique club swing, the processor will compensate for the thickness of the device so the club can contact the ball as if the device were not there.

Once the dial 124 is depressed and the ball levitated, a countdown timer in the processor may start. For example, the ball 16 may remain levitated for a predetermined countdown period, such as 60 seconds. At the end of the predetermined countdown period, the device 120 may automatically deactivate. Similar to the object positioning system 10 discussed above, both the ball 16 and the portable device 120 may include one or more sensors and/or wireless communication components 100, 162 that enable the device 120 to recognize the ball 16 when the ball is above or on the engagement platform 150.

It is to be understood that the above description is intended to be illustrative, and not restrictive. For example, the above-described embodiments (and/or aspects thereof) may be used in combination with each other and the drawings are not necessarily to scale. In addition, may modifications may be made to adapt to a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. In the appended embodiment, the terms "including" and "in which" are used as the plain-English equivalents of the respective terms "comprising" and "wherein." Moreover, the terms "first," "second," and "third," etc. are used merely as labels, and are not intended to impose numerical requirements on their objects.

Different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the specification, including the drawings, shall be construed to constitute a complete written description of all combinations and subcombinations of the embodiments described herein, and of the manner and process of making and using them, and shall support claims to any such combination or subcombination.

What is claimed is:

1. A system for levitating an object above a surface, the system comprising:
    a power source;
    an engagement platform; and
    a magnet array proximate the engagement platform, the magnet array having a plurality of electromagnets and a permanent magnet, the magnet array being in communication with the power source, the magnet array including:
        a central electromagnet;
        a plurality of peripheral electromagnets; and
        a permanent magnet;
    a user input device in communication with the power source; and
    processing circuitry in communication with the user input device,
    the central electromagnet and the plurality of peripheral electromagnets being configured to exert a composite magnetic force having a first magnitude in a first direction and the permanent magnet is configured to exert a magnetic force having a second magnitude in a second direction at least substantially opposite the first direction.

2. The system of claim 1, wherein the permanent magnet is an annular permanent magnet having an aperture.

3. The system of claim 2, wherein the plurality of peripheral electromagnets has a radially symmetrical configuration about the central electromagnet and all of the central and peripheral electromagnets are located within the aperture of the permanent magnet.

4. The system of claim 1, wherein the base further includes a housing having:
    a first plate;
    a second plate opposite the first plate; and
    a frame between the first plate and the second plate.

5. The system of claim 4, wherein the magnet array and processing circuitry are located within the frame.

6. The system of claim 4, wherein the second plate includes an engagement platform, the second direction extending at least substantially orthogonally from the second plate.

7. The system of claim 1, wherein the power source is configured to deliver an adjustable current to the magnet array, the magnet array being located beneath the engagement platform such that the magnetic force exerted by the central electromagnet and the plurality of peripheral electromagnets at least partially controls a levitation height of the at least substantially spherical object above the base.

8. The system of claim 7, wherein the user input device is configured to adjust an amount of current delivered from the power source to the magnet array, increasing the amount of current causing the levitation height to decrease and decreasing the amount of current causing the levitation height to increase.

9. The system of claim 1, wherein the power source is configured to be selectively activated and deactivated and the processing circuitry is programmed to put the system in standby mode when the power source is activated and when no object is on the engagement platform, the first magnitude being greater than the second magnitude when the system is in standby mode.

10. The system of claim 1, wherein the system further comprises a housing, the user input device, the power source, the magnet array, and the processing circuitry all being at least partially located within the housing.

11. The system of claim 10, wherein the user input device is configured to receive a height selection made by a user.

12. A system for levitating an object above a surface, the system comprising:
    a power source;
    an engagement platform; and
    a magnet array proximate the engagement platform, the magnet array having a plurality of electromagnets and a permanent magnet, the magnet array being in communication with the power source;
    a user input device in communication with the power source, the user input device being configured to receive a height selection made by a user;
    processing circuitry in communication with the user input device; and
    a housing, the user input device, the power source, the magnet array, and the processing circuitry all being at least partially located within the housing,
    the user input device being a dial that is retractable within the housing, retraction of the dial activating the power source.

13. A system for levitating an object above a surface, the system comprising:
    a power source;
    an engagement platform;
    a magnet array proximate the engagement platform, the magnet array having a plurality of electromagnets and a permanent magnet, the magnet array being in communication with the power source;
    a user input device in communication with the power source;
    processing circuitry in communication with the user input device; and
    a housing, the user input device, the power source, the magnet array, and the processing circuitry all being at least partially located within the housing,
    the housing including an upper surface, the engagement platform being defined by the upper surface of the housing.

14. A system for levitating an object above a surface, the system comprising:
    a power source;
    an engagement platform;
    a magnet array proximate the engagement platform, the magnet array having a plurality of electromagnets and a permanent magnet, the magnet array being in communication with the power source;

a user input device in communication with the power source;

processing circuitry in communication with the user input device; and a housing, the user input device, the power source, the magnet array, and the processing circuitry all being at least partially located within the housing, the housing including an upper surface, a lower surface, and a longitudinal axis, the upper surface including an aperture, the engagement platform being sized to pivotably move within the aperture about the housing longitudinal axis.

15. The system of claim 14, wherein the engagement platform includes an upper surface and a lower surface, the magnet array being coupled to the lower surface of the engagement platform, the system further comprising a counterweight, the counterweight being coupled to the engagement platform such that the engagement platform maintains an at least substantially horizontal position relative to the housing.

16. A system for controlling a height of a levitated object based on a height selection made by a user, the system comprising:

a user input device being configured to receive the height selection made by the user;

a base in communication with the user input device, the base including:

a magnet array having a central electromagnet configured to exert an adjustable magnetic force in a first direction, a plurality of peripheral electromagnets each being configured to exert an adjustable magnetic force in the first direction, and a permanent magnet being configured to exert a non-adjustable magnet force in a second direction at least substantially opposite the first direction;

processing circuitry in communication with the user input device; and a housing having an engagement platform, the second direction extending at least substantially orthogonally from the engagement platform; and a power source in communication with and being configured to deliver an adjustable current to the magnet array, the magnet array being located beneath the engagement platform such that the magnetic force exerted by the central electromagnet and the plurality of peripheral electromagnets at least partially controls a levitation height of the at least substantially spherical object above the engagement platform, the user input device being configured to adjust an amount of current delivered from the power source to the magnet array based on the height selection made by the user, the user input device being configured to increase the amount of current to decrease the levitation height and to decrease the amount of current to increase the levitation height.

17. A system for levitating an at least substantially spherical object, the system comprising:

a user input device;

a base in communication with the user input device, the base including:

a magnet array having a central electromagnet configured to exert an adjustable magnetic force in a first direction, a plurality of peripheral electromagnets each being configured to exert an adjustable magnetic force in the first direction, and an annular permanent magnet having an aperture, the permanent magnet being configured to exert a non-adjustable magnet force in a second direction at least substantially opposite the first direction;

a magnet array mounting plate, the magnet array being coupled to the magnet array mounting plate such that the plurality of peripheral electromagnets have a radially symmetrical configuration about the central electromagnet and all of the central and peripheral electromagnets are within the aperture of the permanent magnet;

at least one printed circuit board having processing circuitry and at least one wireless communication component, the processing circuitry being in communication with the user input device; and a housing having a first plate, a second plate opposite the first plate, and a frame between the first plate and the second plate, the magnet array, magnet array mounting plate, and at least one printed circuit board being located within the frame, the second plate including an engagement platform, the second direction extending at least substantially orthogonally from the second plate, the first plate, the second plate and the frame each having a diameter, the diameter of the first and second plates being at least substantially the same, the diameter of the frame being less than the diameter of each of the first and second plates; and a power source in communication with the user input device and the base and being configured to deliver an adjustable current to the magnet array, the magnet array being located beneath the engagement platform such that the magnetic force exerted by the central electromagnet and the plurality of peripheral electromagnets at least partially controls a levitation height of the at least substantially spherical object above the engagement platform, the user input device being configured to adjust an amount of current delivered from the power source to the magnet array, increasing the amount of current causing the levitation height to decrease and decreasing the amount of current causing the levitation height to increase.

* * * * *